United States Patent
Murai et al.

(10) Patent No.: US 7,146,734 B2
(45) Date of Patent: Dec. 12, 2006

(54) ROLLING ELEMENTS FOR ROLLING BEARING, METHOD OF PRODUCING THE SAME, AND ROLLING BEARING

(75) Inventors: Takashi Murai, Kanagawa (JP); Katsuhiro Yamazaki, Kanagawa (JP); Haruki Tsutsui, Kanagawa (JP)

(73) Assignee: NSK Ltd., Tokyo (JP)

( * ) Notice: Subject to any disclaimer, the term of this patent is extended or adjusted under 35 U.S.C. 154(b) by 118 days.

(21) Appl. No.: 10/733,471

(22) Filed: Dec. 12, 2003

(65) Prior Publication Data

US 2004/0120623 A1   Jun. 24, 2004

Related U.S. Application Data

(62) Division of application No. 10/093,373, filed on Mar. 11, 2002, now Pat. No. 6,752,696.

(30) Foreign Application Priority Data

Mar. 12, 2001 (JP) .......................... P.2001-067958
Nov. 15, 2001 (JP) .......................... P.2001-349596
Dec. 27, 2001 (JP) .......................... P.2001-398017

(51) Int. Cl.
*B21D 53/10* (2006.01)
*B21K 1/02* (2006.01)

(52) U.S. Cl. .................................. 29/898.069; 29/899

(58) Field of Classification Search ............... 29/899, 29/898.069, 898.061, 898.062; 384/491, 384/498, 499, 504, 514, 513
See application file for complete search history.

(56) References Cited

U.S. PATENT DOCUMENTS

| | | | | |
|---|---|---|---|---|
| 665,905 A * | 1/1901 | Hill | ........................ | 29/898.069 |
| 801,338 A * | 10/1905 | Reid | ............................ | 29/899 |
| 1,204,127 A * | 11/1916 | Canda | ........................ | 72/330 |
| 1,431,183 A * | 10/1922 | Rockwell | ............... | 29/898.069 |
| 1,701,736 A * | 2/1929 | Timken | ................. | 29/898.068 |
| 1,784,463 A * | 12/1930 | Nice | ..................... | 29/898.068 |
| 2,313,876 A * | 3/1943 | Ulrich | ................... | 29/898.069 |
| 2,614,317 A * | 10/1952 | Emil | ..................... | 29/898.069 |
| 2,867,000 A * | 1/1959 | Huszar | ....................... | 425/297 |
| 3,337,278 A * | 8/1967 | Zoltan | ........................ | 384/491 |
| 5,976,053 A * | 11/1999 | Kino et al. | ................... | 476/73 |

FOREIGN PATENT DOCUMENTS

| DE | 20 14 419 A | 10/1970 |
|---|---|---|
| DE | 122651 | * 10/1976 |
| DE | 33 08 735 A1 | 10/1983 |
| DE | 4334195 | * 3/1994 |
| DE | 100 27 105 A1 | 2/2001 |

(Continued)

OTHER PUBLICATIONS

JPO Machine Translation of JP 2001-050264.*

(Continued)

*Primary Examiner*—Eric Compton
(74) *Attorney, Agent, or Firm*—Sughrue Mion, PLLC

(57) ABSTRACT

A method of producing rolling elements for a rolling bearing comprises mixing to process rounded elements made of steel balls and spherical rolling elements having outer diameter portion portion becoming a rolling contact face. The rolling contact face has curvatures in an axial direction and a radial direction normal to the axial direction, and has at least one plane. The thus mixed elements are placed and processed in a space between two processing boards opposing each other via the determined space. Thereby, the surfaces of the rounded balls and the rolling elements are processed to be rounded.

7 Claims, 17 Drawing Sheets

FOREIGN PATENT DOCUMENTS

| | | | |
|---|---|---|---|
| DE | 10027105 | * | 2/2001 |
| JP | 07-185716 | * | 7/1995 |
| JP | 08-218150 | * | 8/1996 |
| JP | 9-126233 | | 5/1997 |
| JP | 09-126233 | * | 5/1997 |
| JP | 10-175124 | * | 6/1998 |
| JP | 2000-254858 | | 9/2000 |
| JP | 2000-254858 A | | 9/2000 |
| JP | 2001-50264 | | 2/2001 |
| SU | 706177 | * | 12/1970 |

OTHER PUBLICATIONS

German=Book M. Albart/H. Kottritsch, "Walzlager, Theorie und Praxis", Springer Verlag Wien—New York, 1987, p. 333.

* cited by examiner

Prior Art

Prior Art

# ROLLING ELEMENTS FOR ROLLING BEARING, METHOD OF PRODUCING THE SAME, AND ROLLING BEARING

This is a divisional of application Ser. No. 10/093,373 filed Mar. 11, 2002 now U.S. Pat. No. 6,752,696; the disclosure of which is incorporated herein by reference.

BACKGROUND OF THE INVENTION

The present invention relates to a bearing enabling to receive radial load, axial load exerting in both directions, and moment load, which is used to, for example, industrial machines, robots, medical appliances, food machinery, semi-conductor/liquid crystal making apparatus, optical and optoelectronics apparatus.

As those enabling to receive radial load, axial load exerting in both directions, and moment load by means of one bearing, known are a cross roller bearing shown in FIG. 24, a four point-contacting ball bearing shown in FIG. 25, or a three point-contacting ball bearing shown in FIG. 26.

In the cross roller bearing shown in FIG. 24, a rolling element 300 is a roller, and since the rolling elements 300 and bearing rings 100, 200 make line-contacts at two positions, it has a merit of large moment rigidity. In the four point-contacting ball bearing shown in FIG. 25, or in the three point-contacting ball bearing shown in FIG. 26, the rolling element 400 is a ball, and since the rolling element 400 and the bearing rings 100, 200 make point-contacts at four or three positions, those have merits of low torque and smooth working.

However, the cross roller bearing has the merit of large moment rigidity, while in contrast since the rolling element 300 and the bearing ring 100 make the line-contact, it also has disadvantages of large torque and large torque fluctuation.

In the four or three point-contacting ball bearings, as the rolling element 400 is ball, it has a merit of smaller torque than that of the cross roller in the same dimensions, but on the other hand, it also has a disadvantage of small moment rigidity. In case the radial load is superior to the axial load, or in case of receiving pure radial load, as the respective balls 400 make the four or three point-contacts with the bearing rings 100, 200, spin of the ball 400 is large and a small spin wearing performance is not provided. Further, for improving an ordinary spin wearing performance even being a bit, a space of the bearing is determined to be positive, and as a result, the moment rigidity of the bearing is made small.

For settling these problems, excepting large spin of the four point-contacting ball bearing, a new and useful rolling bearing was previously invented (Japanese Patent Laid Open No. 50264/2001), enabling to receive radial load having lower torque, axial load exerting in both directions, and moment load.

Namely, this rolling bearing has a structure as follows. A plurality of rolling elements are incorporated between a pair of bearing rings, and the respective bearing rings have raceway grooves comprising raceway surfaces Alarger in diameter than radius of the rolling element. At least one of the bearing rings is composed of two raceway surfaces, and the rolling element has the outer diameter portion to be a rolling contact surface having curvatures not only in the radial direction normal to the axial direction but also in the axial direction and concurrently has at least one plane. The rolling elements are alternately arranged on the circumference of the raceway surface as crossing with one another, and the outer diameter portions of the rolling elements always contact at the two points in total one by one on the raceway surface of the opposite one-sided bearing ring and on the raceway surface of the other-sided bearing ring. This rolling bearing has the new and useful working effects as follows.

① As the rolling elements are alternately arranged on the circumference of the raceway surface as crossing with one another between the inner and outer rings, it is possible to receive the radial load, axial load exerting in both directions, and moment load by means of one bearing.

② As the respective rolling elements always contact at the only two positions with the inner and outer bearing rings, the sliding owing to relatively large spin that had occurred in the conventional four point contact ball bearing or three point contact ball bearing, so that anti-spin wearing property may be heightened.

③ As the space of the bearing may be set to be small or negative if necessary, the high moment rigidity can be realized.

④ As the rolling element and the bearing ring make the point-contact, rolling resistance is low in comparison with a cross roller, so that a low torque can be realized.

So far, the rolling element incorporated in the rolling bearing is carried out with a machining process when making a blank ball of the rolling element so as to form a plane 501 (FIG. 27A). After forming the plane 501 by the machining process, a spheroidizing process for forming a rolling face 502 depends on a ball mass-production method (for example, described in Japanese Patent Laid Open No. 254858/2000 shown in FIGS. 27B and 27C, spherical balls 500 to be processed (rolling elements) are passed through between mutual grooves of two processing discs 600, 700 opposite with a fixed space so as to turn out substantially spherical balls).

That is, as shown in FIG. 27, the spherical part of the outer diameter portion (or the opposite end face) becoming a rolling face 502 is chucked for processing the plane 501 by means of a grinding tool 800, and therefore, the plane-processing precision is high, but cost for producing the rolling elements is increased, and products are high in comparison with ordinary round balls.

In the conventional machining process, sharp edges 900 are created at a crossing point between the plane 501 and the outer diameter portion 502 (the rolling face) having the curvature. Accordingly, a rounding process is required to the edge 900 after processing the spherical shape of the rolling face 502, and the cost is more heightened.

Under such situations, a unit cost of the rolling element 500 is higher than that of the round ball, and as a result, the cost of the rolling bearing incorporated with this kind of rolling elements 500 is expensive.

Further, it has been found that, also in the proposed rolling bearing (Patent Laid Open No. 50264/2001), the ball as the rolling element has the plane in at least one part of the ball, and always prevents interference between the raceway surface of the opposite one-sided bearing ring and other raceway surface than the raceway surface of the other-sided bearing ring, and at the same time there still remains a room of improving lubricity for avoiding abrasion of the retainer in the contact part (the crossing edge point between the plane of the rolling element and the outer diameter portion having the plane and the curvature) between the rolling element and the retainer.

SUMMARY OF THE INVENTION

It is an object of a first aspect of the invention to solve the problems involved with the conventional techniques and to provide rolling elements having at least one plane performed with a high precision process, a processing method of mixing at high efficiency rounded rolling elements made of steel balls, while easily processing at high efficiency rolling elements having at least one plane, and a rolling bearing incorporated with rolling elements having at least one plane performed with the high precision process.

The above mentioned objects can be attained by, according to a first aspect of the present invention, a method of producing rolling elements for a rolling bearing, rolling elements, and a rolling bearing. Particularly, the object can be achieved by a method of producing rolling elements for a rolling bearing, rolling elements formed by the method, or a rolling bearing incorporating the rolling elements.

The method of producing rolling elements for a rolling bearing according to the present invention comprises a mixing step and a placing and processing step. In the mixing step, mixed are rounded elements made of steel balls and spherical rolling elements each of which has rolling contact faces having curvatures in an axial direction thereof and a radial direction normal to the axial direction and has at least one plane. In the placing and processing step, the thus mixed elements are placed into a space between two processing discs opposing each other and are processed, in such a manner that the surfaces of the rounded elements and the spherical rolling elements are processed to be rounded.

The other technical instrument adopted by the first aspect of the invention for accomplishing the above mentioned objects is to provide rolling elements of the rolling bearing employing the rolling elements that are produced according to the above-mentioned method, and also a rolling bearing incorporating the same.

It is advantageous that the above-mentioned rolling bearing further comprises:

a first bearing ring has a raceway groove defined by two first raceway surfaces each larger in diameter than radius of the rolling element, and an outer diameter portion of each rolling element always contacts with one of the first raceway surface; and a second bearing ring has a raceway groove with at least one second raceway surface that is larger in diameter than radius of the rolling element, and an outer diameter portion of each rolling element always contacts with one of the at least one second raceway surface, wherein the rolling elements are rotatably disposed between the first and second bearing rings and alternately arranged in a circumference direction thereof as crossing with one another, and wherein the outer diameter portions of the rolling elements always contact with the first and second bearing rings at the two points in total one by one.

In addition, in the rolling bearing, it is preferable that a lubricant storing recess is formed the at least one plane.

It is an object of a second aspect of the present invention to solve the problems involved with the conventional technique, and also to improve a lubricity.

The object can be attained by a rolling bearing according to the present invention. The rolling bearing comprises a first bearing ring, a second bearing ring, and a plurality of spherical rolling elements rotatably interposed therebetween. Each of the plurality of spherical rolling elements has a rolling contact face having curvatures in an axial direction thereof and a radial direction normal to the axial direction and has at least one plane. The first bearing ring has a raceway groove defined by two first raceway surfaces each larger in diameter than radius of the rolling element, and an outer diameter portion of each rolling element always contacting with one of the first raceway surface. The second bearing ring has a raceway groove with at least one second raceway surface that is larger in diameter than radius of the rolling element, and an outer diameter portion of each rolling element always contacts with one of the at least one second raceway surface, whereby the outer diameter portions of the rolling elements always contact at the two points in total one by one. In the rolling bearing, a lubricant storing recess is formed the at least one plane of the at the one plane. The rolling elements are rotatably disposed between the first and second bearing rings and alternately arranged in a circumference direction thereof as crossing with one another. The outer diameter portions of the rolling elements always contact with the first and second bearing rings at the two points in total one by one.

In the rolling bearing, it is preferable that a connecting portion that is located between the rolling contact face and one of the at least one plane and has a predetermined radius of curvature.

The forming of shapes of the connecting portion may depend on the cutting, grinding or the forging process.

Further, an object of the third aspect of the present invention is to cost down the rolling element of the rolling bearing having the outer diameter portion becoming the rolling contact face having the curvatures not only in the radial direction normal to the axial direction but also in the axial direction and having the plane in at least one part, and to reduce the cost of the whole rolling bearing incorporated with this kind of the rolling element.

The technical instrument of the third aspect adopted by the invention for accomplishing the above mentioned object is as follows. Line material of desired length are incorporated in a mold of a header composed in a desired shape, the forge-forming is carried out on the blank ball of the rolling element having the outer diameter portion becoming the rolling contact face having the curvatures not only in the radial direction normal to the axial direction but also in the axial direction and having the plane in at least one part, and an extra flesh is removed from the outer diameter portion of the blank ball, whereby the rolling element for the rolling bearing is produced.

In addition, a connecting point between the plane and the outer diameter portion has a predetermined radius of curvature.

The method of producing the rolling element comprises incorporating the wire materials of desired length in the mold of the header composed in the desired shape, carrying out the forge-forming on the blank ball having the outer diameter portion to be the rolling contact face with the curvatures not only in the radial direction normal to the axial direction but also in the axial direction and having the plane in at least one part, and removing the extra flesh from the outer diameter portion of the blank ball.

In addition, when forge-forming the blank balls of rolling elements, a connecting point between the plane and the outer diameter portion having the curvature is connected through the arbitrary curvature R, the blank ball of rolling element may be produced.

As the rolling bearing incorporated with the rolling elements, in the rolling bearing where the plurality of rolling elements are incorporated between a pair of bearing rings, the respective bearing rings have raceway grooves comprising raceway surfaces larger in diameter than radius of the rolling element, among them, at least one of bearing rings is composed of the two raceway surfaces, and the rolling element has the outer diameter portion to be the rolling contact surface having curvatures not only in the radial direction normal to the axial direction but also in the axial direction, the respective rolling elements are alternately arranged on the circumference of the raceway surface as crossing with one another, and the outer diameter portions of the rolling elements always contact at the two points in total one by one on the raceway surface of the opposite one-sided bearing ring and on the raceway surface of the other-sided bearing ring, the rolling element is characterized in that the wire materials of desired length are incorporated in the mold of the header composed in a desired shape, the forge-forming is carried out on the blank ball of the rolling element having the outer diameter portion becoming the rolling contact face having the curvatures not only in the radial direction normal to the axial direction but also in the axial direction and having the plane in at least one part, and an extra flesh is removed from the outer diameter portion of the blank ball, whereby the rolling element for the rolling bearing is produced. When forge-forming the blank balls of rolling elements, the crossing point between the plane and the outer diameter portion having the curvature is connected through the arbitrary curvature R.

Depending on the forging, the rolling bearing can be produced at low cost, though being complicated in the plane shape.

Note that in the specification "rounded element" means a substantially true rounded element having high sphericality.

BRIEF DESCRIPTION OF THE DRAWINGS

FIG. 27 is the method of producing this kind of the conventional rolling bearing.

DETAILED DESCRIPTION OF THE PREFERRED EMBODIMENTS

Explanation will be made to one embodiment of the present invention referring to the attached drawings This embodiment is only disclosed for explaining the invention, not applied to any limited interpretation, but may be modified arbitrarily as far as being in the range of the invention.

Figure 1:
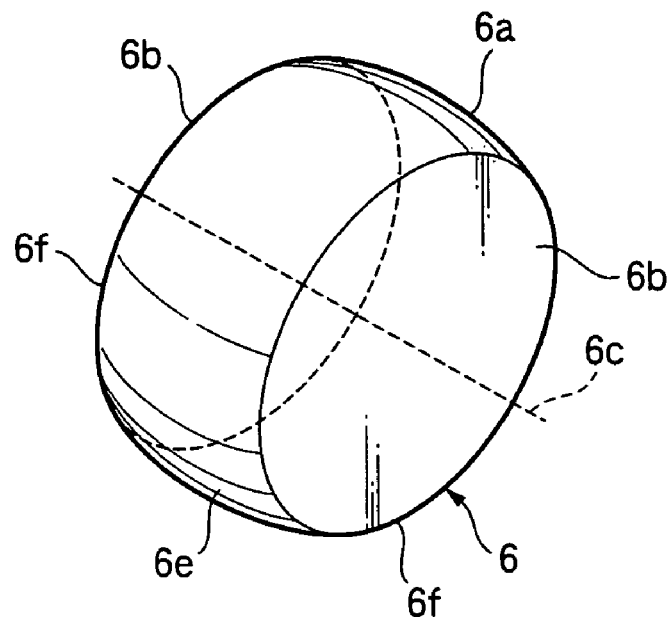
FIG. 1 is an enlarged perspective view showing a first embodiment of the rolling element having two planes.
Figure 4:
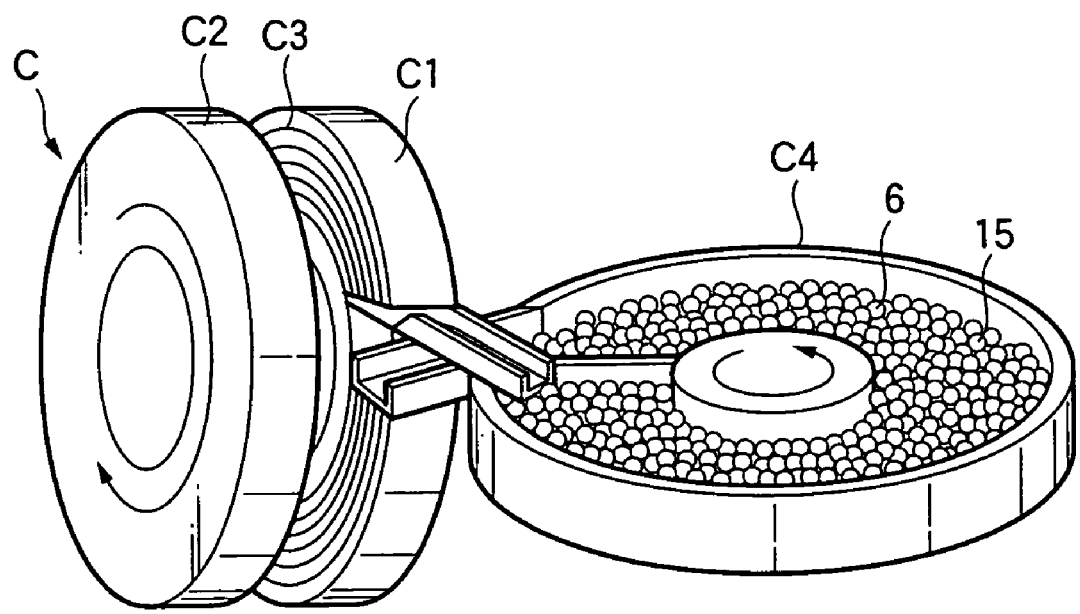
FIG. 4 is a perspective view showing an elementary structure of the sphere processing apparatus for practicing a processing method of the rolling elements.

FIG. 1 shows a first embodiment of the rolling element as a first aspect of the invention, and a spherical process is carried out by means of a sphere processing apparatus shown in FIG. 4.

The rolling element 6 is made of, for example, a steel material such as SUJ-2 (quench-and-temper product), having the outer diameter portion 6a to be a rolling contact face having the curvatures not only in the radial direction normal to the axial direction but also in the axial direction and formed in spherical shape having at least one plane 6b, and the spherical surface 6e (excepting the plane) of the rolling element 6 is processed to be rounded. 6c designates a central axis of rotation.

For example, the rolling element 6 is formed to be a ball cut at the upper and lower parts for defining a pair of planes 6b, 6b (the opposite faces) (referring to such a structure defined with the opposite faces 6b, 6b by cutting the upper and lower parts of the ball, and the same is applied in the following description), and the rounding process is performed on the spherical surface with the round processing apparatus.

The rolling element is not limited to the cut width of the upper and lower parts, the cutting rate may be equal or non-equal arbitrarily if being within the range of the invention. That is, the opposite faces 6b, 6b of the rolling elements 6 may be symmetrical or asymmetrical within the inventive range.

Figure 2:
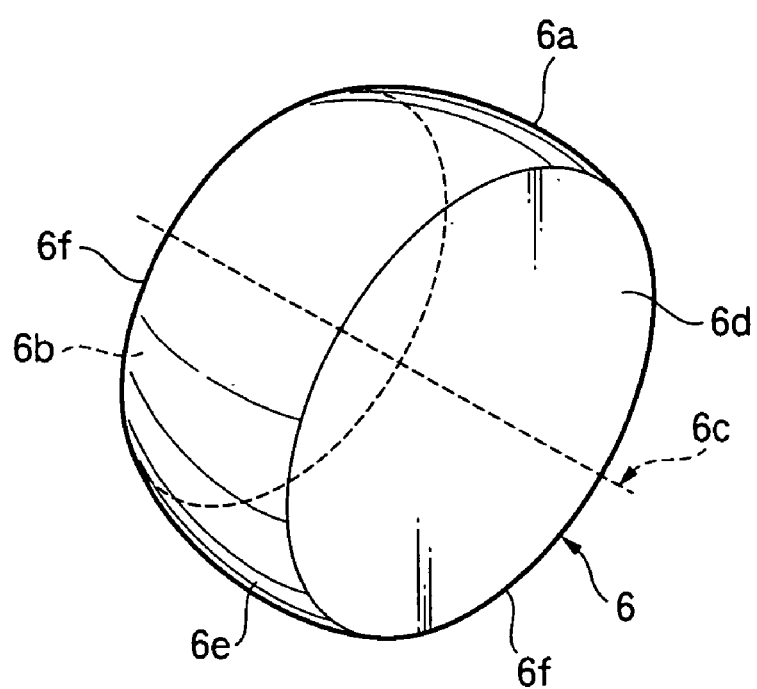
FIG. 2 is an enlarged perspective view showing a second embodiment of the rolling element having two planes.

FIG. 2 is a second embodiment of the rolling element as the first aspect of the invention, having the asymmetrical two planes, and the rolling element of this embodiment is served especially for high rotation.

Figure 7:
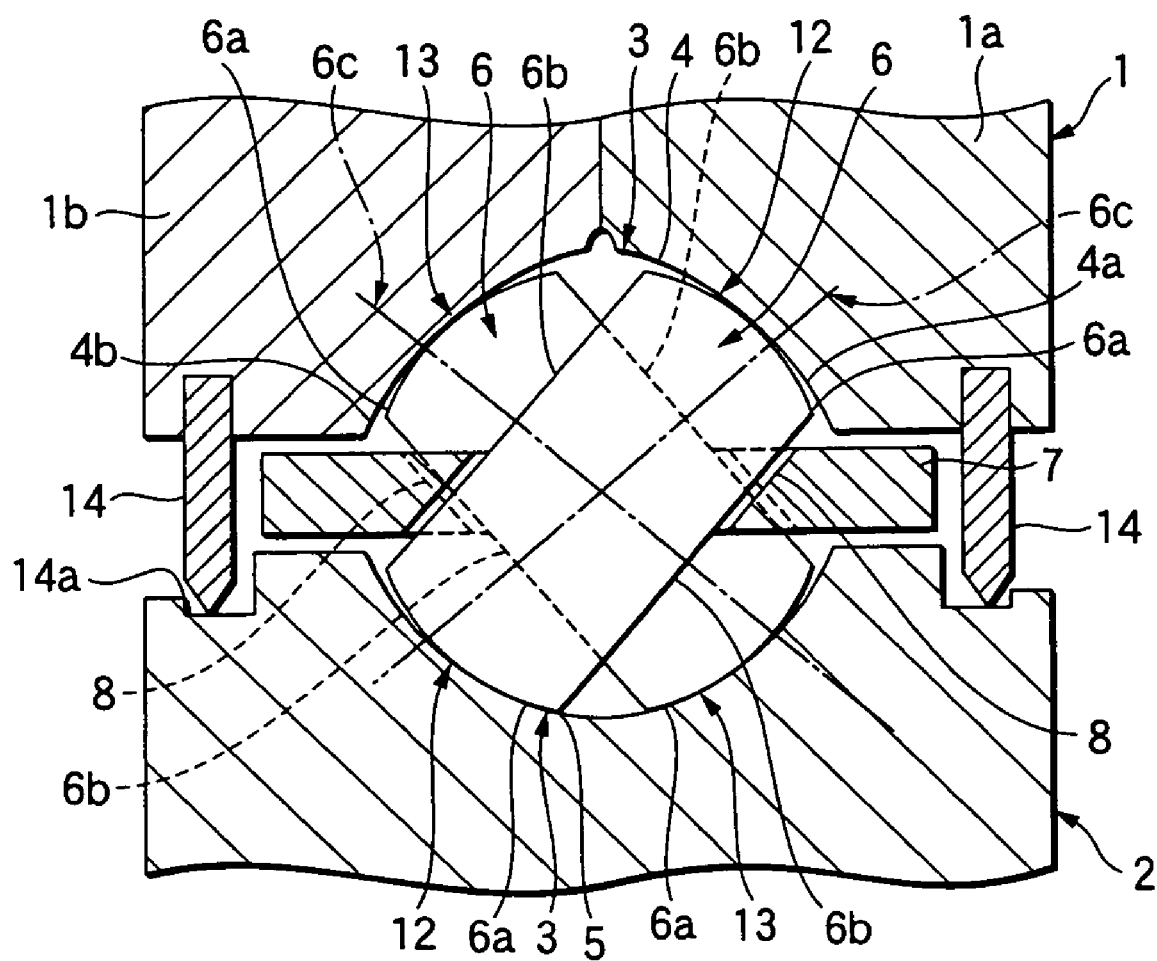
FIG. 7 is a cross sectional view showing one embodiment of the rolling bearing.

The embodied rolling element 6 has the asymmetrical planes 6b, 6d (the opposite faces), and if a large end 6d of the planes 6b, 6d (the relative parts) is arranged to face to an inner ring 2 of the bearing as shown in FIG. 7, rotation of the rolling element 6 is made stable, so that a lower torque can be realized.

Figure 3:
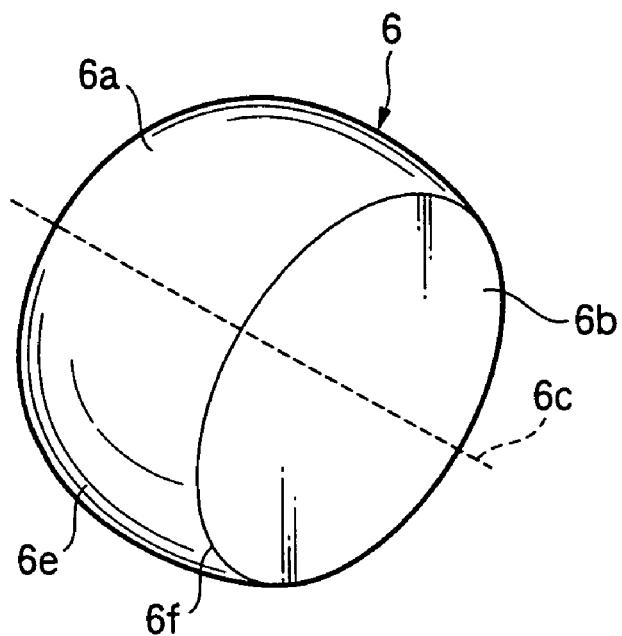
FIG. 3 is an enlarged perspective view of the rolling element having one plane.

Further, the rolling element 6 may be, as seen in FIG. 3, a ball like shape formed with one plane by cutting either of the upper and lower parts only.

The whole shape of the rolling element 6, presence or absence of the planes 6b, 6b (6d), and sizes of the curvature in the axial direction of the outer diameter portion 6a are not limited to the above mentioned shapes at all, and may be optionally modified within the inventive range. For example, it is sufficient that the rolling element 6 has non-parallel both faces instead of the opposite faces 6b, 6b, and has the central axis 6c of rotation perpendicular with respect to both faces.

A boundary 6f between the plane 6b and the spherical surface 6e (the outer diameter portion 6a) is sufficient to leave the edge or to be a smoothly continuous arc without the edge.

Referring FIG. 4, further explanation will be made to one embodiment of the sphere processing method (the rolling element producing method) of the spherical surface of the rolling element 6.

In this embodiment, between the two processing discs C1, C2 opposing each other via the predetermined space, the rolling elements having the plane 6b (called merely as "rolling element" or "rolling elements" hereafter) are mixed together with the rounded elements of steel balls 15 (called merely as "steel ball(s)" or "rounded element(s)" hereafter) to carry out the processing (polishing or grinding), the spherical surface 6e of the rolling element 6 is processed to be rounded.

According to the embodiment, the surface rounding process of the steel balls 15 may also depends on the mixing and processing together with the rolling elements 6.

FIG. 4 is a view showing the structure of the known sphere processing apparatus (a lapping machine) for processing the rolling elements 6 to be rounded.

C1 and C2 designate circular processing discs (lapping discs) opposing each other via a predetermined space.

Both processing discs C1, C2 are formed with coaxial and circular grooves C3 on the mutually opposite faces. C4 designates a disc like conveyor rotating at a normal position and storing much rolling elements 6 and steel balls 15.

Following to rotation of the conveyor C4, the rolling elements 6 and steel balls 15 thereon are sent in succession between both processing discs C1, C2 under a condition of being lined up.

While holding the rolling elements 6 and the steel balls 15 between both processing discs C1, C2 and applying pressure to the processing discs in the axial direction, if rotating at least one processing disc C1 or C2, the rolling elements 6 and the steel balls 15 are processed on the surfaces to be rounded.

Figure 5:
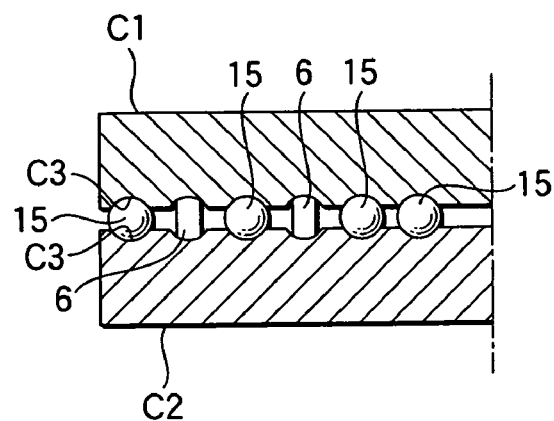
FIG. 5 is a partially enlarged cross sectional view of both processing discs in the sphere processing apparatus shown in FIG. 4.

While processing, as shown in FIG. 5, the rolling elements 6 and the steel balls 15 are guided in the grooves C3 of the processing disc C1, C2 and are processed (polishing or grinding) as being rolled.

It has been already known that, at this time, a fine-particle removing speed on the surface of the spherical element gives influences to finally obtained sphericality, and the slower the processing, the higher the final precision.

Incidentally, it generally takes much time for processing the spherical elements, not unusually spending several days. If the processing speed is lowered, the time is more extended, and consequently, a processing pressure is changed by deformation of the lapping apparatus owing to change in atmospheric temperature, and uniformity is remarkably lacking, so that the sphericality of around several 10 nm has been limited.

Naturally, it goes down below this limitation in case of throwing the only rolling elements 6 having the plane into the apparatus C.

Therefore, this embodiment processes the rolling elements 6 and the steel balls 15 to be rounded on the surface by mixing (polishing or grinding) the rolling elements 6 and the steel balls 15 together.

Viewing from the side of the rolling element 6, the processing load between the processing discs C1, C2 is almost supported by the steel balls 15 only, so that the processing load between the processing discs C1, C2 distributed on the rolling elements 6 is lowered.

Thus, the fine-particle removing process can be carried out on the surface of the rolling elements 6.

Further, since the steel balls 15 support the processing load between the processing discs C1, C2 and restrain the relative position therebetween, and even if the sphere processing apparatus giving influences to the distance therebetween is more or less deformed, the relative size is stabilized, and the rolling elements 6 may be carried out with the fine removal from the surface, so that bad influences are little to the rolling elements 6.

Figure 6:
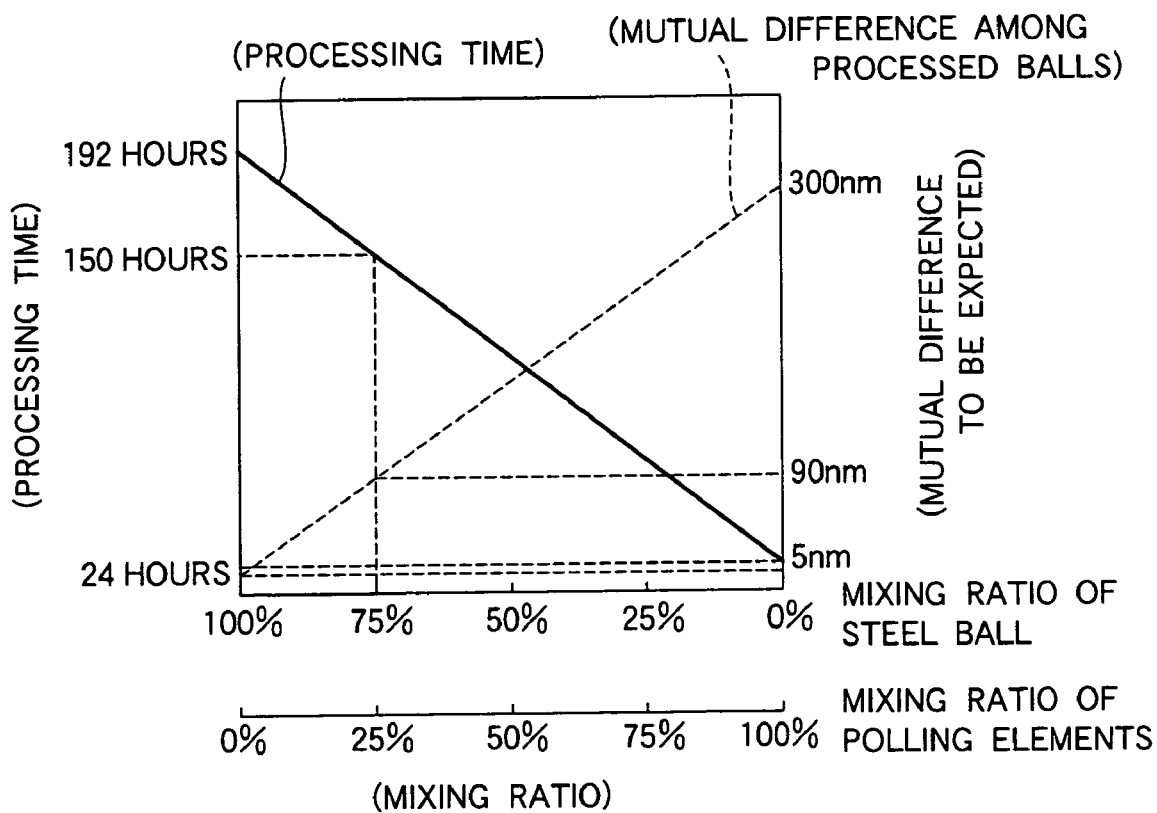
FIG. 6 is a diagram showing the relations among the mixing ratio of the steel balls and the rolling elements, the processing time, and mutual difference to be expected in processed balls.

FIG. 6 is a diagram showing the relations among the mixing ratio of the steel balls 15 and the rolling elements 6, the processing time, and mutual difference to be expected in processed balls 15 and the rolling elements 6. This diagram is prepared under the following conditions.

(A) Practical Materials

The steel balls and the rolling elements: SUJ-2 (quench-and-temper products) and HRC61 to 62

(B) Grinding Stone

Diamond grinding stone+metal bond (C) Average Processing Force per One Rounded Element 200 gr/Piece The processing speed (processing time) follows the mixing ratio of the steel balls 15 and the rolling elements 6 as shown with a solid line in FIG. 6. But with respect to the mutual difference between the finally obtained sphericality and processed balls, the less the removing amount of the ball surface passing once between the processing discs C1, C2, the better, and in particular, the mutual difference in the processed balls does not go down below the removing amount but is as shown with a dotted line in the same.

FIG. 6 presumes the sphere processing apparatus enabling to process the rolling elements of the mutual difference in the processed balls being 30 nm for 24 hours where as one example the rolling element is 100%.

Therefore, taking a balance of the processing time and the required precision into consideration, it is sufficient to perform the process by changing the mixing ratio of the steel balls 15 and the rolling elements 6, and in case the steel balls 15 is 75% and the rolling elements 25%, the processing time takes 150 hours, but the mutual difference in the processed balls can be expected to be less than 90 nm.

As stated in detail, according to the method of processing spherical rolling elements of this embodiment, the rolling elements 6 of the mixing ratio being 1/3 are mixed to the steel balls 15 and processed (polishing or grinding), and in comparison with processing of the rolling elements only, the stable process is progressed bit by bit, and disturbance is less to be influenced, so that the process can be made at high precision.

Further, following the method of this embodiment, the boundary 6f between the plane 6b and the spherical surface 6e (the outer diameter portion 6a) may be made a continuous and smooth arc, and a post-process is not required.

In the lapping apparatus C as the sphere processing apparatus for reducing the invention to practice, it is necessary to maintain the processing load effected to one piece of the processed ball constant for providing the high processing precision, and as it is effective to increase the ball number between the processing discs, a lot is desirably made large, but according to the method of processing the balls of this embodiment, the process of the high precision is possible even in a small lot.

In the above mentioned embodiment, the mixing ratio of the rolling elements 6 to the steel balls 15 is 1/3, but the invention is not limited thereto, and the mixing ratio of the rolling elements 6 to the steel balls 15 can be selected appropriately from the range of 10 to 100%, preferably 10 to 95%, and more preferably 10 to 75%.

Next, referring FIG. 7, explanation will be made to one embodiment of the rolling bearing incorporated with the rolling elements 6.

The rolling bearing is structured by incorporating a plurality of rolling elements 6, 6 . . . in the raceway grooves 3 defined between the inner diameter portion of the bearing ring (the outer ring) 1 and the outer diameter portion of the bearing ring (the inner ring) 2.

One or both of the bearing rings 1, 2 are divided in the axial direction at an arbitrary position in the width direction, and set up with bolts, rivets and the like. In the embodiment, the outer ring 1 is divided into two pieces.

The raceway grooves 3 are defined in the raceway surfaces 4, 5 having larger radii than the radius of the rolling element 6. This embodiment has a structure that the raceway surface 4 of the bearing ring (the outer ring) 1 comprises the two raceway surfaces 4a, 4b having larger radii than the radius of the rolling element 6.

The raceway surfaces 4a, 4b have shapes suitable to rolling of the rolling elements 6, and may have any shapes of arch or V in cross section, curve or linear, and no limitation is provided, for example, a Gothic arch may be available.

The embodiment further has the structure that a grinding margin is formed at the crossing point of the raceway surfaces 4a, 4b of the outer ring for making the grinding process easy, but a raceway groove of continuously elliptic shape without the grinding margin is also possible.

The embodiment has the structure that the raceway surface 4 of the bearing ring (the outer ring) 1 comprises the two raceway surfaces 4a, 4b having larger radii than the radius of the rolling element 6. But contrary to this embodiment, such structures are available that the raceway surface 5 of the bearing ring (the inner ring) 2 comprises the two raceway surfaces of larger radii than the radius of the rolling element 6, or that the raceway surfaces 4, 5 of the bearing ring (the outer ring) 1 and the bearing ring (the inner ring) 2 comprise the two raceway surfaces of the larger radii than the radius of the rolling element 6. That is, no limitation is provided if the raceway surface 4 or 5 of at least one of the bearing ring (the outer ring) 1 and the bearing ring (the inner ring) comprises the two raceway surfaces of larger radii than the radius of the rolling element 6.

The grinding margin can be formed similarly to the above mentioned even if the bearing ring (the inner ring) 2 comprises the two raceway surfaces.

The rolling element 6 is composed as mentioned above, and the rolling elements 6, 6 . . . adjacent in the circumferential direction are incorporated alternately as crossing with each other such that the central axes 6c of rotation perpendicular with respect to the planes 6b, 6b of the respective rolling elements 6 cross with each other, while the outer diameter portions 6a of the rolling elements 6 always contact at the two points in total one by one on the raceway surface 4 (4a, 4b) of the opposite one-sided bearing ring 1 and on the raceway surface 5 (5a, 5b) of the other-sided bearing ring 2.

The crossing condition of the central axes (own-rotational axes) 6c of the rolling elements 6 may be orthogonal or non-orthogonal.

The crossing practice of the rolling elements 6 is not especially limited if the number in both raceway grooves is the same. Namely, it is sufficient that the rolling elements 6 cross with per one piece, and if not crossing with per one piece and the number is the same in both raceway grooves, the rolling elements cross per two pieces or cross as two, one, one, two pieces, and any of practices fall within the inventive range.

Figure 8:
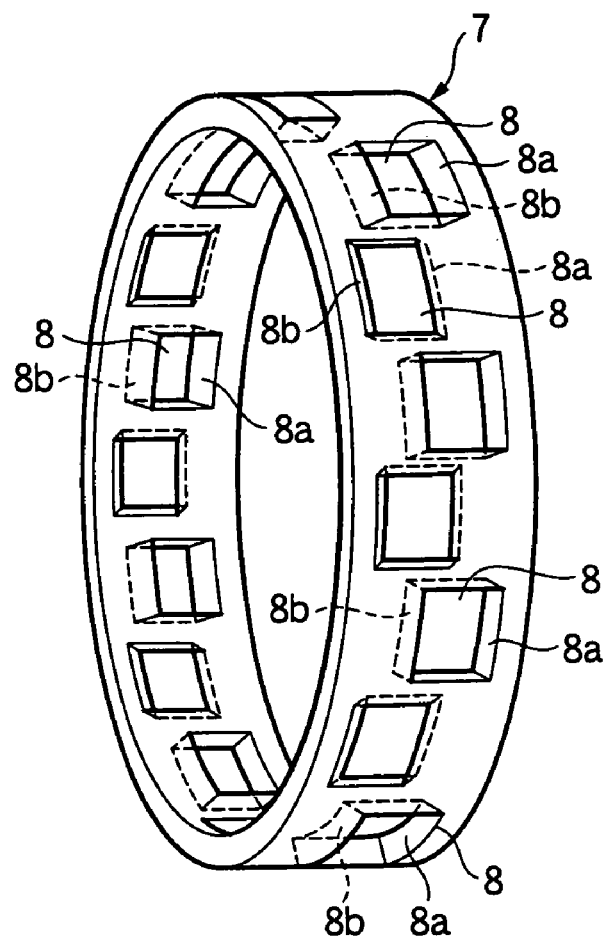
FIG. 8 is a perspective view showing one embodiment of a retainer.
Figure 9:
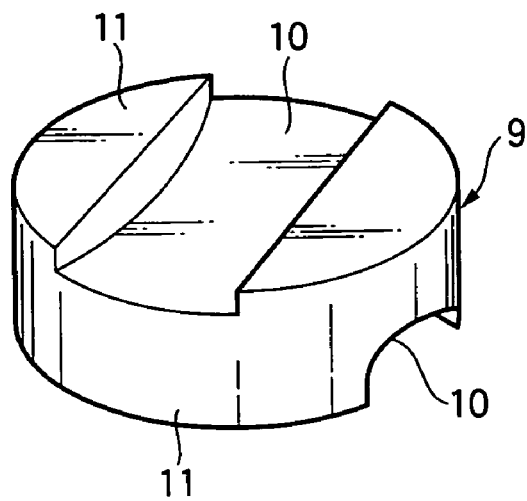
FIG. 9 is a perspective view showing one embodiment of a separator.

Actuation of the rolling elements 6, 6 is guided by the retainer 7 (refer FIG. 8) or the separator (spacer) 9 (refer FIG. 9).

If the retainer 7 and the separator (spacer) 9 are shaped to have pockets 8 . . . for holding and guiding the rolling elements 6 or grooves 10, 10, no limitation is provided, and arbitrary selection or alternation are possible within the inventive range.

The guiding practice of the retainer 7 is not especially limited, and the retainer is sufficient for practicing the inner ring, the outer ring or the rolling element.

Further, no limitation is made to the structure or form of the retainer 7, for example, one-body type or several-part type are available.

For example, the retainer 7 has the pockets 8 . . . enabling to incorporate the adjacent rolling elements 6, 6 such that the central axes 6c, 6c of rotation cross with one another equidistantly on the circumference of an annular-shaped member at the amount of the same number as that of the rolling elements 6 . . . .

Both sides 8a, 8b in the axial direction of the respective pockets 8 . . . are alternately parallel, and neither vertical nor parallel with respect to the rotating axis of the bearing but both sides are at a fixed angle (oblique) of an equivalent level to a contact angle of the rolling element 6.

The distance between both sides 8a, 8b in the axial direction of the respective pockets 8 . . . is slightly larger than the width of the rolling element 6.

In regard to the shape of the pocket, if the pocket 8 has both sides 8a, 8b of parallel obliquity and the distance between both sides 8a, 8b in the axial direction of the respective pockets 8 . . . is slightly larger than the width of the rolling element 6, the whole shape of the pocket is not limitedly comprehended, and alternations are available within the inventive range.

In this embodiment, the pockets 8 . . . of the same number as that of the rolling elements 6 . . . alternately cross equidistantly on the circumference of a ring body, but not especially limited, and it is sufficient that the rolling elements 6 cross with per one piece, and if not crossing with per one piece and the number is the same in both raceway grooves, the rolling elements cross per two pieces or cross in a manner of two, one, one, two pieces, and any of practices fall within the inventive range.

Owing to influences of various factors, the rotating rolling element is possibly created with spin or skew, and unless a posture of the rolling element is desirably controlled, there occurs possibility that rotation resistance of the bearing is large or smooth rotation fails.

Thus, following the embodiment, the pocket 8 of the retainer 7 has both parallel sides 8a, 8b almost the same as the fixed angle at an equivalent level to the contact angle of the rolling element 6, and both parallel sides 8a, 8b of the pocket may control changes in the posture of the rolling element 6 by spin or skew of the rolling element 6, and the bearing has the maintained posture, so that a low torque of the bearing can be realized.

The separator 9 has a smaller diameter than that of the rolling element 6, and is formed with the adjacent concave arch grooves 10, 10 formed as crossing in the opposite faces 11, 11, which grooves hold the respective rolling elements 6, 6 such that the central axes 6c, 6c cross with each other as mentioned above.

The radius of curvature of the arch groove 10 is almost the same as that of the outer diameter portion 6a of the rolling element or may be larger, arbitrarily.

The whole bearing may be made compact by using the separator 9.

A condition of giving pre-load between the rolling element and the raceway surface is not especially limited, and whether or not giving the pre-load during production falls within the inventive range.

Materials of the bearing rings 1, 2 and the rolling element 6 of the bearing are an ordinary ball-bearing steel, and if increasing corrosion resistance or heat resistance in response to serving circumstances, a corrosion resistant film, a stainless steel, a heat resistant steel (e.g., M50), or ceramics are appropriately selected without especial limitations.

Materials of the retainer 7 are optionally selected from a machined cage, a press cage, or resin cage, and for example, metals as brass or iron, or synthetic resins as polyamide 66 (nylon 66), polyphenylene sulfide (PPS) are selected within the inventive range without defining any limitation.

The interior space of the bearing is set to be small or negative (minus) as needed, so that the high moment rigidity of the bearing can be realized.

In FIG. 7, a reference numeral 14 designates a sealing plate to which any of a contact seal, a non-contact seal or a non-contact shield is applied without limiting shapes within the inventive range.

14a designates a sealing face of the sealing plate 14 to be a sealing face by closing to an inner bottom of the sealing groove of the inner ring.

A positioning arrangement of the sealing plate 14 is not especially limited, and if required, it may be positioned at both sides or one side, and either is within the inventive range. The sealing faces for the outer ring and the inner ring exist in the inventive range.

Shapes of the seal, for example, lip shape and others are not especially defined, and any of a line-contact or a face-contact with the sealing face exist in the inventive range.

Presence or absence of a core metal is also optional, and according to request, a type with or without the core metal may be chosen without the limited comprehension.

Structures of the sealing grooves of the inner ring 1 and the outer ring 2 are not limited, either, within the inventive range.

Presence or absence of the sealing plate 14 is also optional, and according to request, either will do in the inventive range.

Therefore, according to the embodiment, the outer diameter portions 6a of the rolling elements 6 always contact at the two points in total one by one on the raceway surface 4a of the opposite outer ring 1 and on the raceway surface 5 of the inner ring 2 (the contact points are shown with 12, 12), and the adjacent rolling elements 6 contact on the raceway surface 4b of the outer ring 1 and on the raceway surface 5 of the inner ring 2 at the two points in total one by one (the contact points are shown with 13, 13).

As the rolling elements 6, 6 cross with each other at contact angle, the radial load, axial load exerting in both directions and moment load can be received by one bearing.

Besides, the rolling element 6 contacts the raceway surfaces 4a and 5 at one points respectively, while the other rolling element 6 contacts the raceway surfaces 4b and 5 at one points respectively, and as the contact points are the point-contacts (12•12, and 13•13) at only two points (the two positions), it is possible to avoid a large spin occurring in the existing four-point contact bearing).

As the contacting between the rolling elements 6, 6 and the outer and inner rings 1, 2 is the same as in general ball bearings, the rolling resistance is low in comparison with a cross roller, so that the low torque can be realized.

Explanation will be made to one embodiment of the second aspect of the invention referring to the attached drawings.

This embodiment is only disclosed for explaining the invention, not applied to any limited interpretation, but may be modified arbitrarily as far as being in the range of the invention.

The rolling bearing of the second aspect of the invention is used to, for example, industrial machines, robots, medical appliances, food machinery, semi-conductor/liquid crystal making apparatus, optical and optoelectronics apparatus.

The rolling bearing is structured by incorporating a plurality of rolling elements 26, 26 . . . in the raceway grooves 23 defined between the inner diameter portion of the bearing ring (the outer ring) 21 and the outer diameter portion of the bearing ring (the inner ring) 22.

One or both of the bearing rings 21, 22 are divided in the axial direction at an arbitrary position in the width direction, and set up with bolts, rivets and the like. In case of dividing into two and when a flange is present, fixture at the flange may be served as securing the divided bearing ring. In this case, a shaping structure of the flange is not especially applied with the limited comprehension, and sizes of the flange in the axial direction may be symmetrical or asymmetrical arbitrarily, and designs may be modified within the inventive range. For heightening the precision in attaching positions between the flange and the opposite parts to be attached, a faucet may be made to the flange.

Figure 20:
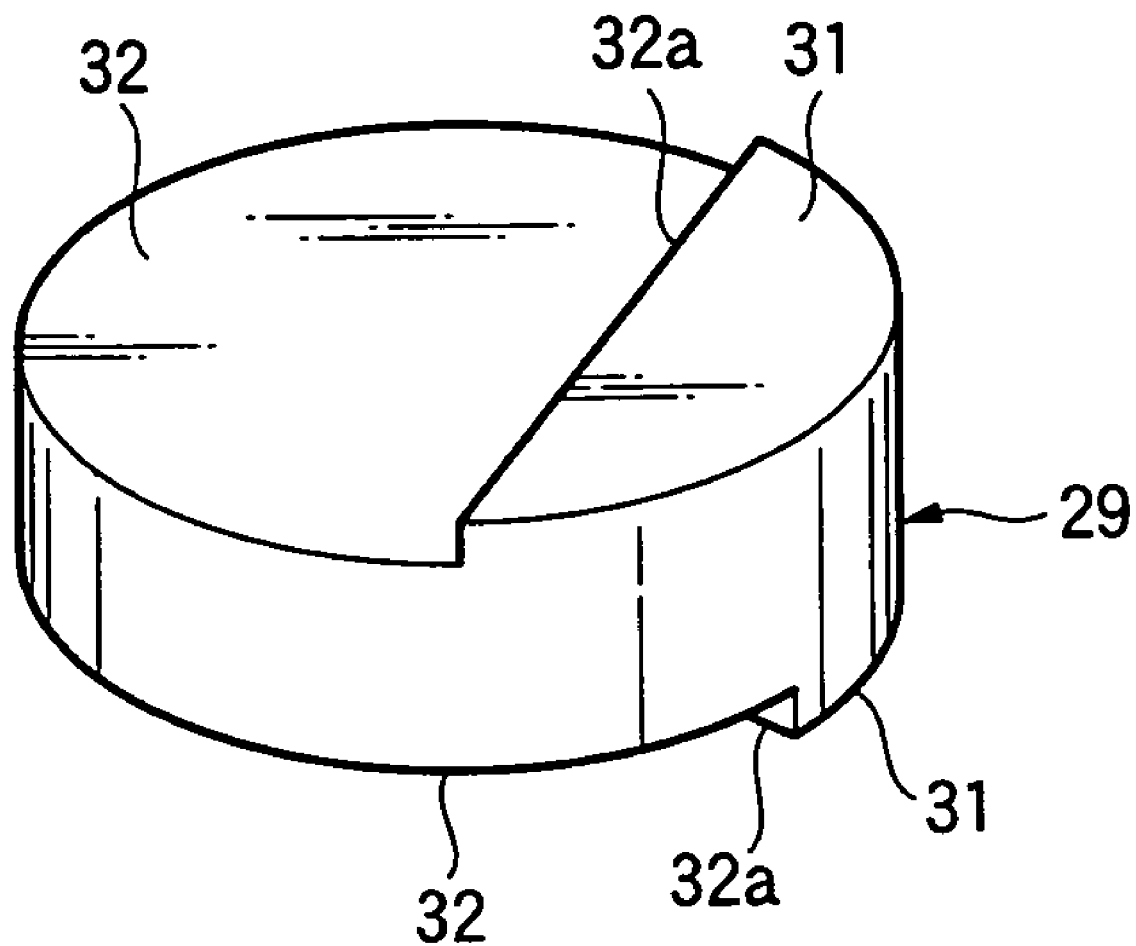
FIG. 20 is a perspective view showing an embodiment of the separator for the rolling element shown in FIG. 15.

As shown in FIG. 20, the raceway groove 23 is formed with the raceway surfaces 24, 25 of larger radii than the radius of the rolling element 26. At least one of raceway surfaces 24, 25 of the raceway grooves 23 of the bearing rings 21, 22 is composed of the two raceway surfaces 24a, 24b or 25a, 25b of larger radii than the radius of the rolling element 26.

The raceway surfaces 24 (or 24a, 24b), 25 (or 25a, 25b) have shapes suitable to rolling of the rolling elements 26, and may have any shapes of arch or V in cross section, curve or linear, and no limitation is provided, for example, a Gothic arch may be available.

The embodiment further has the structure that a grinding margin is formed at the crossing point of the raceway surfaces 24a, 24b of the outer ring for making the grinding process easy, but a raceway groove of continuously elliptic shape without the grinding margin is also possible.

The rolling element 26 has the outer diameter portion 26a becoming the rolling contact face having the curvature in the axial direction and has an arbitrary shape having the smaller radius than the radii of the raceway surfaces 24 (24a, 24b), 25 (25a, 25b), and the adjacent rolling elements 26 are disposed as crossing with each other, and the outer diameter portion 26a of the rolling element 26 always contacts at the two points in total one by ore on the raceway surface 24 (24a, 24b) of the opposite one-sided bearing ring 21 and on the raceway surface 25 (25a, 25b) of the other-sided bearing ring 22.

Figure 11:
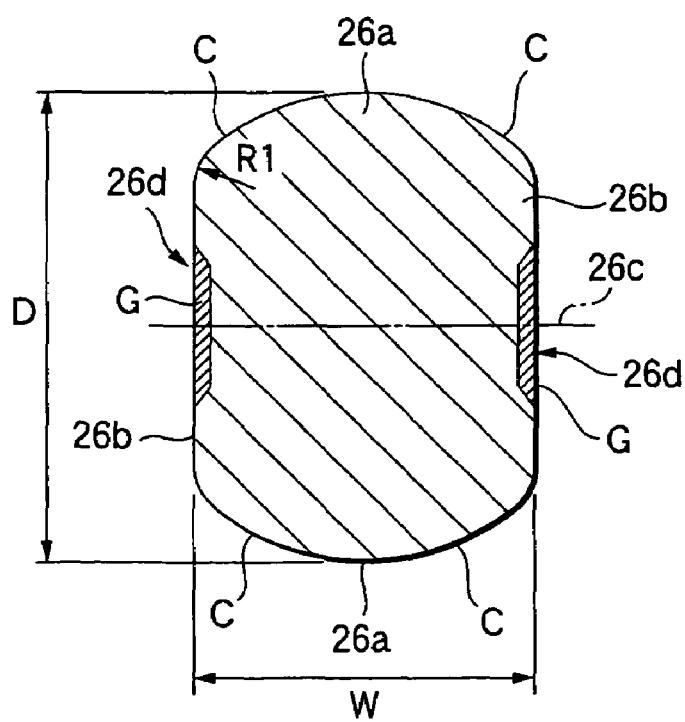
FIG. 11 is a cross sectional view showing one embodiment of the rolling element.

For example, the rolling element 26 shown in FIG. 11 is formed to be a ball cut at the upper and lower parts for defining a pair of planes 26b, 26b (the relative faces) (referring to such a structure defined with the relative faces 26b, 26b by cutting the upper and lower parts of the ball, and the same is applied in the following description), and the planes 26b, 26b are provided at the center parts with recesses 26d in conical shape (in this embodiment, tapered toward a center of the ball) as lubricant pools, and the crossing point C between the planes 26b, 26b and the outer diameter portions 26a, 26a having the curvature is connected with an arbitrary curvature R.

The respective rolling elements 26 are incorporated such that the central axis 26c of rotation perpendicular with respect to the planes 26b, 26b, and the outer diameter portion 26a of the rolling element 26 always contacts at the two points in total one by one on the raceway surface 24 (24a, 24b) of the opposite one-sided bearing ring 21 and on the raceway surface 25 (25a, 25b) of the other-sided bearing ring 22.

The recess part 26d is not limited to the illustrated shape, for example, contrary to the illustrated example, a conical-trapezoidal shape expanding toward the center of the ball is sufficient. Further, desired shapes are enough as a semi-spherical, cylindrical, or rectangular shapes, otherwise a slit-like groove (single or plural pieces) lateral in a diameter direction is also satisfactory. The recess parts may be formed in one or plural positions. In a case of forming the recess parts in the plural positions, those may be continuous or independent, and not only the same shape but optional ones may be selected. In the recess 26d, a desired lubricant (grease or oil) G is stored or sealed.

Figure 14:
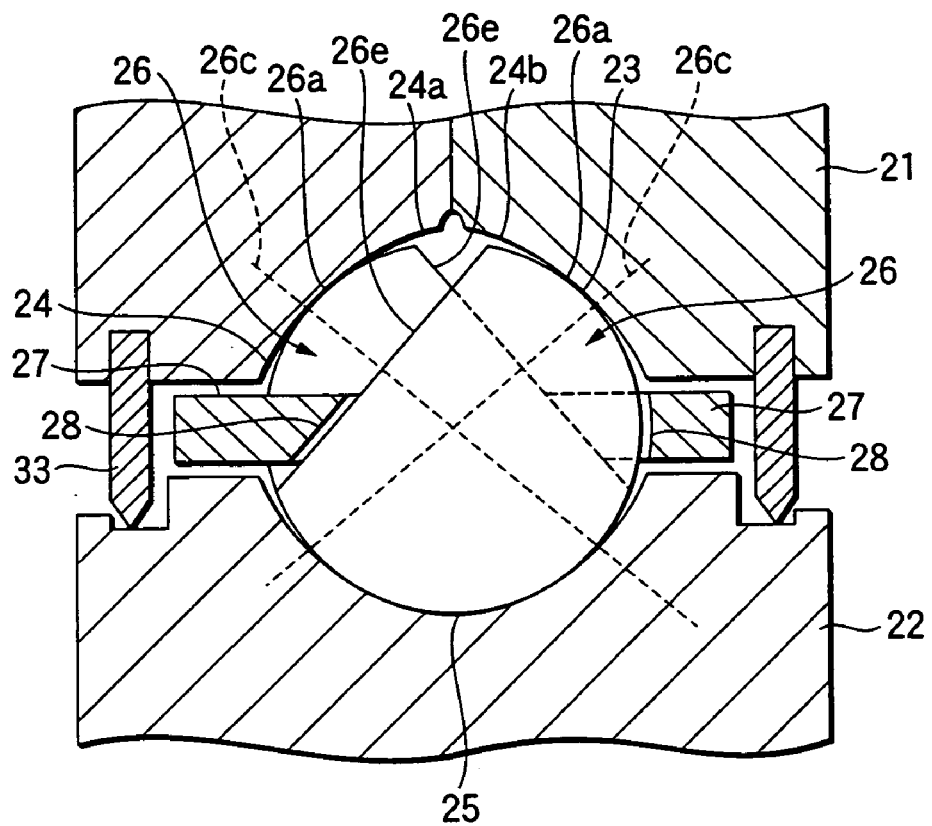
FIG. 14 is a vertical cross sectional view of the invention incorporated with the rolling element of another embodiment.
Figure 15:
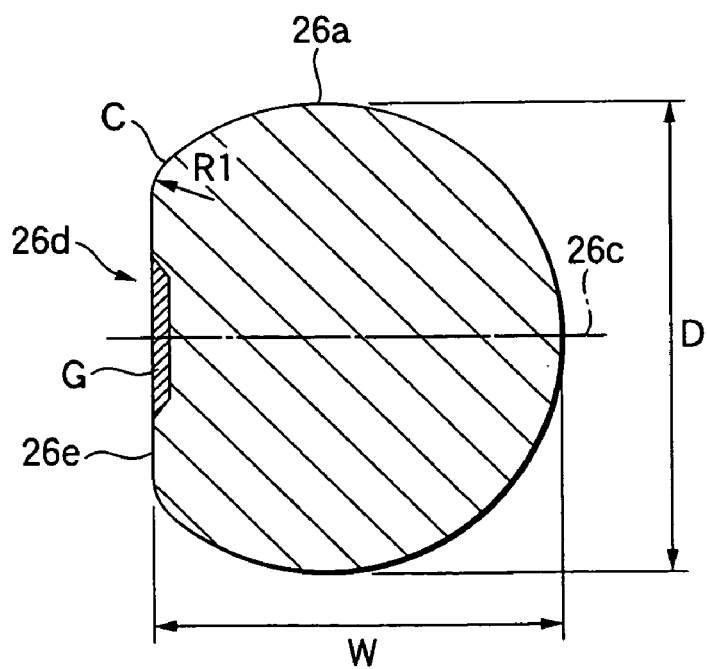
FIG. 15 is a cross sectional view showing the rolling element incorporated in the rolling element of FIG. 14.

It is sufficient that the rolling element 26 is, as shown in FIG. 15, cut at either of an upper part and a lower part to provide one-side cut ball formed with one plane 26e, and also in this case, the plane 26e is defined with a somewhat dimpled recess 26d as the lubricant pool as mentioned above, and the crossing point C between the planes 26b, 26b and the outer diameter portions 26a, 26a having the curvature is connected with an arbitrary curvature R. FIG. 14 shows one embodiment where the rolling elements (one-side cut ball) illustrated in FIG. 15 are incorporated between the outer and inner rings 21, 22. The outer and inner rings 21, 22 are structured as explained above. By the way, in this embodiment, the only raceway surface 24 of the outer ring 21 is composed of the two raceway surfaces 24a, 24b of larger radii than the radius of the rolling element 26, while the raceway surface 25 of the inner ring 22 is a single raceway surface.

One example of the specific structure of the rolling element 26 shown in FIG. 11 is as follows.

Ball diameter D: 6.35 mm,
Distance W between the planes: 4.5 mm
Recess part: about 1.5 mm, depth: about 0.2 mm
Crossing point between the outer diameter portion and the plane: connected at R of 1 mm One example of the specific structure of the rolling element 26 shown in FIG. 15 is as follows.

Figure 10:
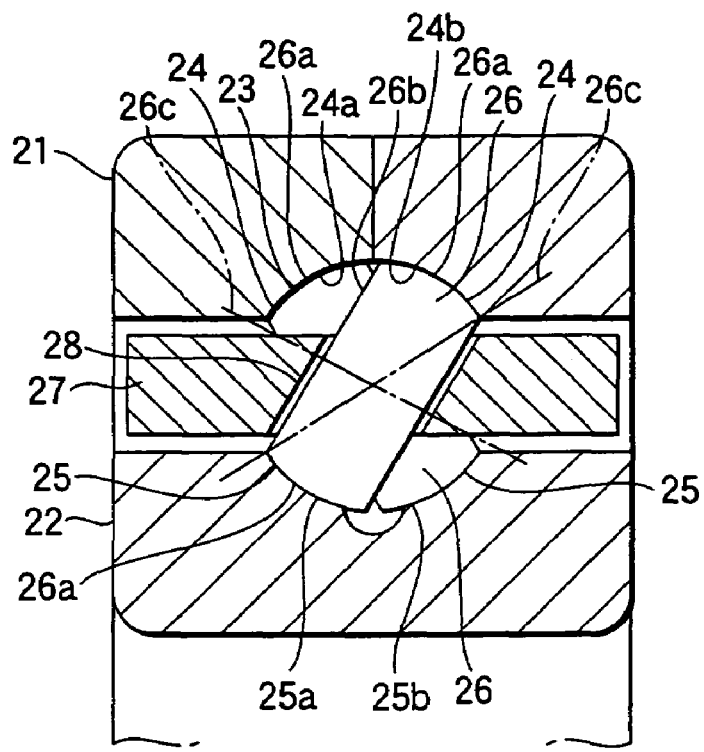
FIG. 10 is a vertical cross sectional view showing a second embodiment of the invention.

Ball diameter D: 6.35 mm,
Distance W between the planes: 5.425 mm
Recess part: about 1.5 mm, depth: about 0.2 mm
Crossing point between the outer diameter portion and the plane: connected at R of 1 mm As illustrated in FIGS. 10 and 15, the rolling element 26 is guided by the retainer 27, and in particular, with respect to fluctuations to the contact angle of the rolling element 26, the plane 26b (26e) of the rolling element 26 is guided by the pocket width face of the retainer 27, and so usually the lubrication around this contact part is taken as a problem. However, according to the invention, since the recess 26d as the lubricant pool is provided in the plane 26b (26e) of the rolling element 26, the contact part between the retainer 27 and the plane 26b (26e) of the rolling element always contributes to good formation of an oil film by a base oil (when lubricating a grease) of a grease G or an oil (when lubricating the oil), no abnormal abrasion occurs in the retainer 27.

Also when the rolling element 26 falls down within the pocket of the retainer 27, since the crossing point C between the plane 26b (26e) and the outer diameter portion 26a having the curvature is connected at an arbitrary curvature R, no abnormal abrasion by the edge portion occurs in the retainer 27.

So far, a sharp edge has been created at the crossing point C between the plane 26b (26e) and the outer diameter portion 26a having the curvature, and the edge portion has been rounded after having performed the round processing of the rolling face (the outer diameter portion 26a), but in the invention, the edge portion is in advance connected at the arbitrary curvature R, so that the rounding process on the edge portion is not required after having performed the round processing of the rolling face, and the abnormal abrasion does not happen the retainer 27.

The rolling element 26 is not especially limited in the upper and lower cut widths thereof, and the cutting ratio may be equal or non-equal arbitrarily within the range of the invention. That is, the relative faces 26b, 26b of the rolling element 26 may be symmetrical or asymmetrical within the inventive range. The rolling element having the asymmetrical two planes, is served especially for high rotation. If a large end 26d of the asymmetrical planes (the relative parts) is arranged to face to the inner ring of the bearing, rotation of the rolling element 6 is made stable, so that a lower torque can be realized.

The whole shape of the rolling element 26, presence or absence of the relative planes 26b, 26b, and sizes of the curvature in the axial direction of the outer diameter portion 26a are not limited to the above mentioned shapes at all, and may be optionally modified within the inventive range. For example, it is sufficient that the rolling element 26 has non-parallel both faces instead of the relative faces 26b, 26b, and has the central axis 26c of rotation perpendicular with respect to both faces.

The rolling elements 26, 26 . . . are incorporated such that the central axes 26c, 26c of rotation perpendicular with respect to the respective relative planes 26b, 26b, 26b, 26b of the adjacent rolling elements 26, 26 cross with each other, and the crossing condition may be orthogonal or non-orthogonal.

The crossing practice of the rolling elements 26 is not especially limited if the number in both raceway grooves is the same. Namely, it is sufficient that the rolling elements 26 cross with per one piece, and if not crossing with per one piece and the number is the same in both raceway grooves, the rolling elements cross per two pieces or cross as two, one, one, two pieces, and any of practices fall within the inventive range.

Figure 12:
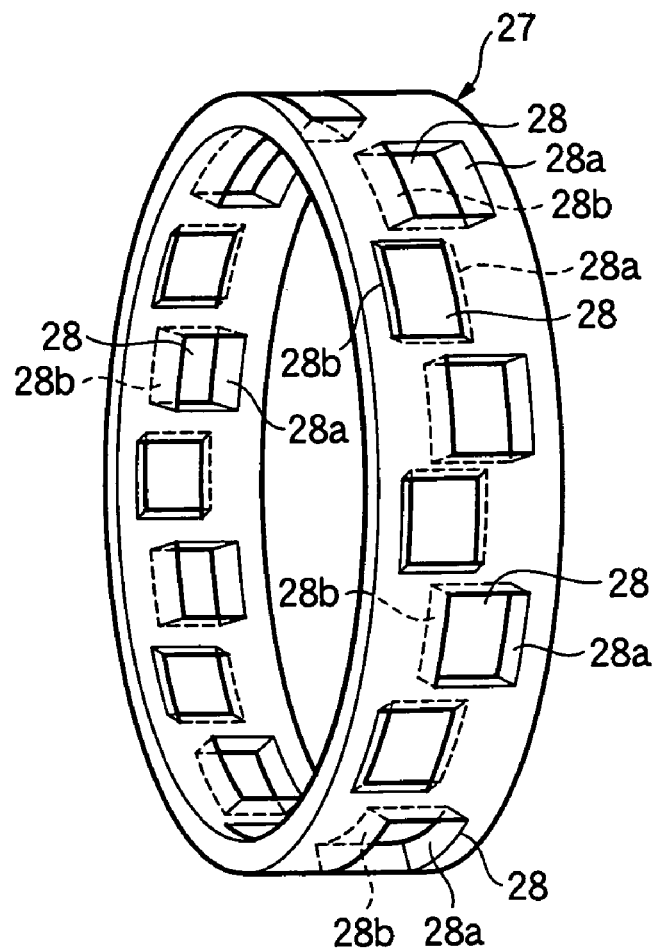
FIG. 12 is a perspective view showing one embodiment of the retainer for the rolling element shown in FIG. 11
Figure 13:
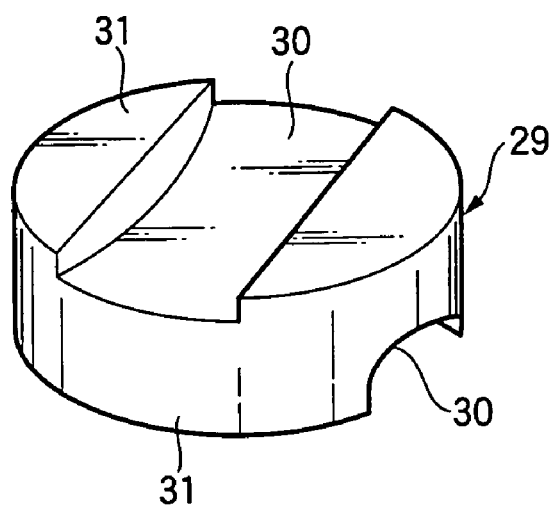
FIG. 13 is a perspective view showing one embodiment of the separator.
Figure 16:
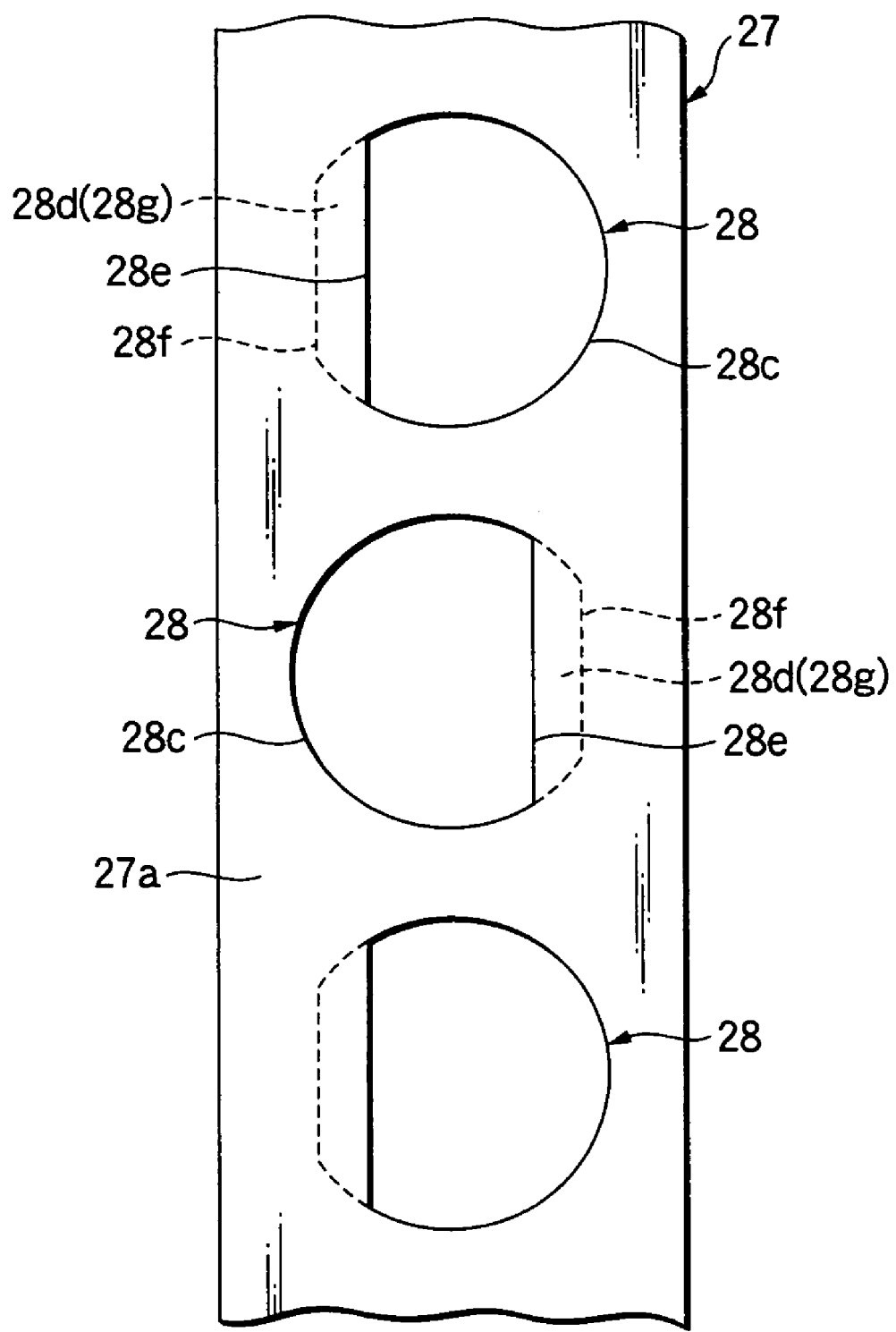
FIG. 16 is a plan view showing, partially in section, the embodiment of the retainer for the rolling bearing shown in FIG. 15.

Actuation of the respective rolling elements 26 is guided by the retainer 27 or the separator (spacer) 29. FIG. 12 is the retainer for the rolling element shown FIG. 11, FIG. 13 is the separator for the rolling element shown in FIG. 11, FIGS. 16 and 17 are the retainers for the rolling elements shown in FIG. 15, and FIG. 20 is an example of separator for the rolling element shown in FIG. 15.

If the retainer 27 and the separator (spacer) 29 are shaped to have pockets 28 . . . for holding and guiding the rolling elements 26 or grooves 30, or the recess 32, no limitation is provided, and arbitrary selection or alternation are possible within the inventive range.

The guiding practice of the retainer 27 is not especially limited, and the retainer is sufficient for practicing the inner ring, the outer ring or the rolling element.

Further, no limitation is made to the structure or form of the retainer 27, for example, one-body type or several-part type are available.

For example, explaining the retainer 27 shown in FIG. 12, the retainer 27 has the pockets 28 . . . enabling to incorporate the adjacent rolling elements 26, 26 such that the central axes 26c, 26c of rotation cross with one another equidistantly on the circumference of the annular-shaped member at the amount of the same number as that of the rolling elements 26.

Both sides 28a, 28b in the axial direction of the respective pockets 28 . . . are alternately parallel, and neither vertical nor parallel with respect to the rotating axis of the bearing but both sides are at a fixed angle (oblique) of an equivalent level to a contact angle of the rolling element 26.

The distance between both sides 28a, 28b in the axial direction of the respective pockets 28 . . . is slightly larger than the width of the rolling element 26.

In regard to the shape of the pocket, if the pocket 28 has both sides 28a, 28b of parallel obliquity and the distance between both sides 28a, 28b in the axial direction of the respective pockets 28 . . . is slightly larger than the width of the rolling element 26, the whole shape of the pocket is not limitedly comprehended, and alternations are available within the inventive range.

In this embodiment, the pockets 28 . . . of the same number as that of the rolling elements 26 . . . alternately cross equidistantly on the circumference of the ring body, but not especially limited, and it is sufficient that the rolling elements 26 cross with per one piece, and if not crossing with per one piece and the number is the same in both raceway grooves, the rolling elements cross per two pieces or cross in a manner of two, one, one, two pieces, and any of practices fall within the inventive range.

Owing to influences of various factors, the rotating rolling element is possibly created with spin or skew, and unless a posture of the rolling element is desirably controlled, there occurs possibility that rotation resistance of the bearing is large or smooth rotation fails.

Thus, following the embodiment, the pocket 28 of the retainer 27 has both parallel sides 28a, 28b almost the same as the fixed angle at an equivalent level to the contact angle of the rolling element 26, and both parallel sides 28a, 28b of the pocket may control changes in the posture of the rolling element 26 by spin or skew of the rolling element 26, and the bearing has the maintained posture, so that a low torque of the bearing can be realized.

The separator 29 shown in FIG. 13 has a smaller diameter than that of the rolling element 26, and is formed with the adjacent concave arch grooves 30, 30 formed as crossing in the opposite faces 31, 31, which grooves hold the respective rolling elements 26, 26 such that the central axes 26c, 26c cross with each other as mentioned above.

The radius of curvature of the arch groove 30 is almost the same as that of the outer diameter portion 26a of the rolling element or may be larger, arbitrarily.

The whole bearing may be made compact by using the separator 29.

Explaining the holder 27 shown in FIG. 16, the holder 27 has the pockets 28, 28 . . . enabling to incorporate the adjacent rolling elements 26, 26 such that the central axes 26c, 26c of rotation perpendicular with respect to the planes 26e, 26e cross with one another equidistantly on the circumferential direction.

Figure 17A:
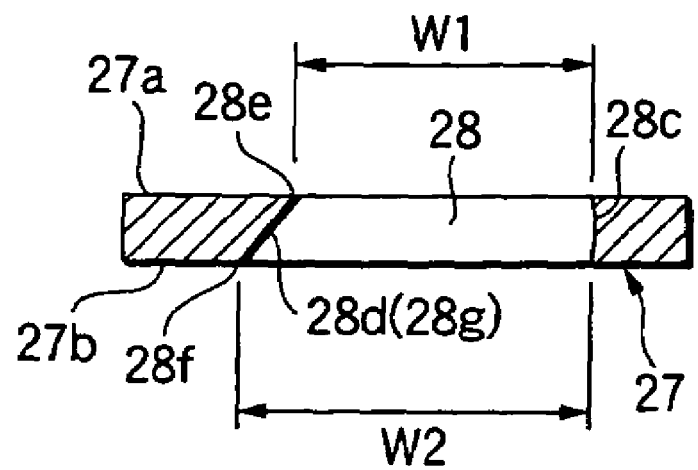
FIGS. 17A and 17B are plan views showing, partially in section, another embodiment of the retainer for the rolling element shown in FIG. 15.

The pocket 28 is composed in a doom shape viewed from plane with an arc face 28c larger a bit than the rolling element 26 and the flat face 28d connecting the edge of the arc face 28c. One side 28e of the outer diameter portion 27a and one side 28f of the inner diameter portion 27b communicate with each other at an oblique face 28g from the outer diameter portion 27a to the inner diameter portion 27b, and an opening width W 22 of the inner diameter portion 27b is made larger than an opening width W 21 of the outer diameter portion 27a (FIGS. 16 and 17A).

The centers of the arc faces 28c of the pockets adjacent in the circumferential direction are arranged on the same circumference, and the position of one side 28e of the outer diameter portion 27a is off toward the width viewed from plane. That is, the respective pockets 27 adjacent in the circumferential direction have the oblique faces 28g arranged alternately right and left (see FIG. 16).

Therefore, if using the retainer 27 illustrated in this embodiment, the rolling elements 26 disposed in the respective pockets 28 are held so that the respective cut faces 26e, 26e direct to the outer diameter portion 27a, i.e., to the outer ring 21, in such a manner that the central axes 26c, 26c of rotation of the adjacent retainers 26, 26 cross one another.

Figure 17B:
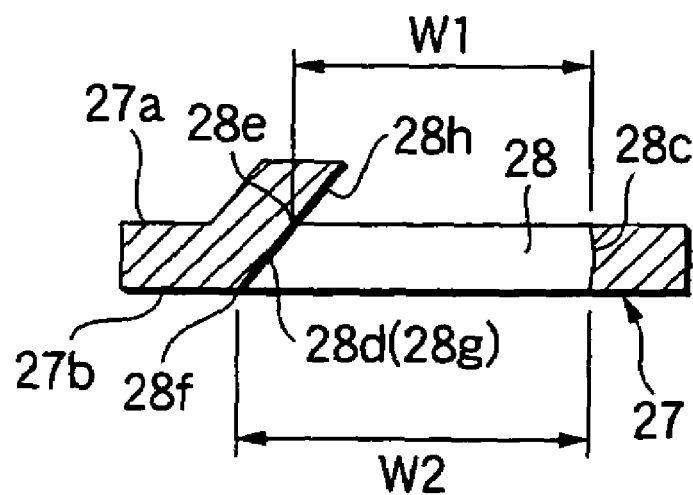

As shown in FIG. 17B, it is possible to adopt such a structure having one side-fall avoiding piece 28h formed with a stand-up on the outer diameter portion 27a in an extension of an oblique face 28g. One side-fall avoiding piece 28h is not limited to the illustrated shape, and unless no influence is given to rotation of the rolling element 26, any shapes are within the range of the invention.

Next, the retainer 27 shown in FIG. 18 will be explained. The pocket 28 of the retainer 27 is composed to be rectangular viewed from the plane. One side 28e extending in the circumferential direction of the outer diameter portion 27a and one side 28f of the inner diameter portion 27b thereunder communicate with each other at the oblique face 28g from the outer diameter portion 27a to the inner diameter portion 27b, and the opening width W 22 of the inner diameter portion 27b is made larger than the opening width W 21 of the outer diameter portion 27a (FIGS. 18 and 19).

The pockets arranged on the circumference are off toward the width viewed from plane.

Figure 18:
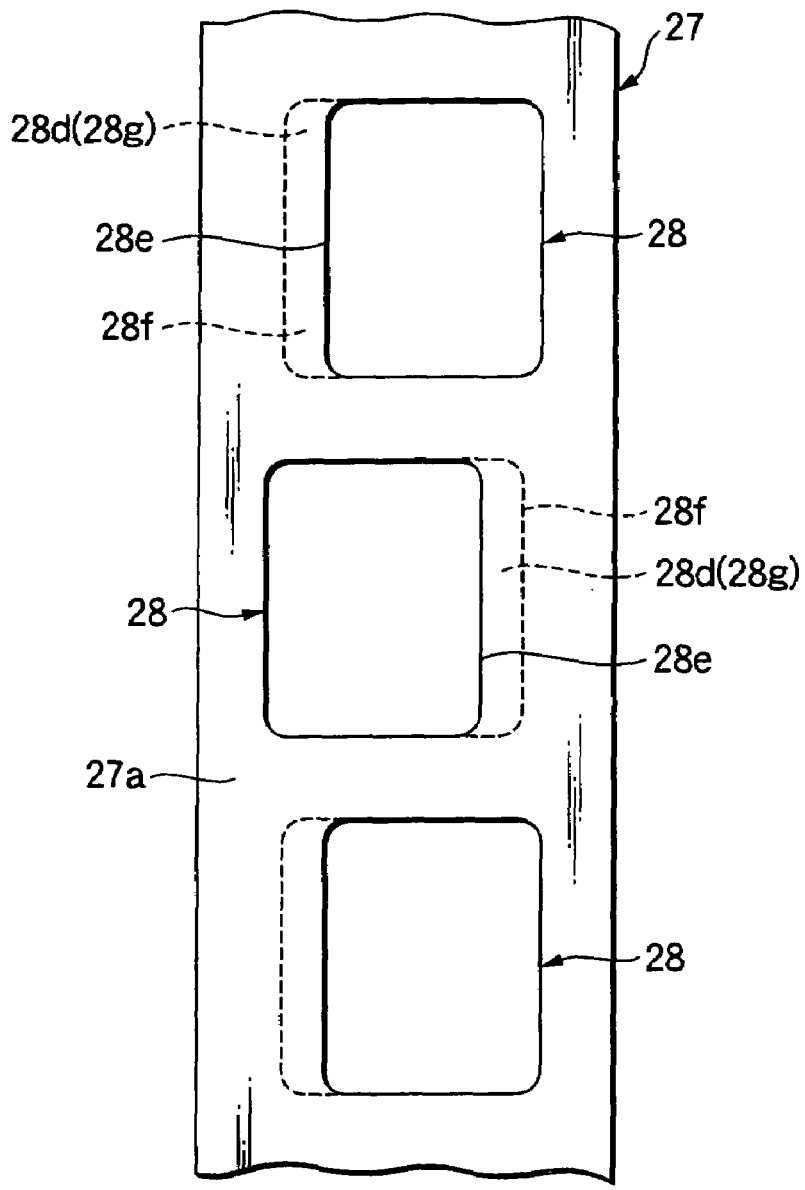
FIG. 18 is a plan view showing, partially in section, the other embodiment of the retainer for the rolling element shown in FIG. 15.
Figure 19:
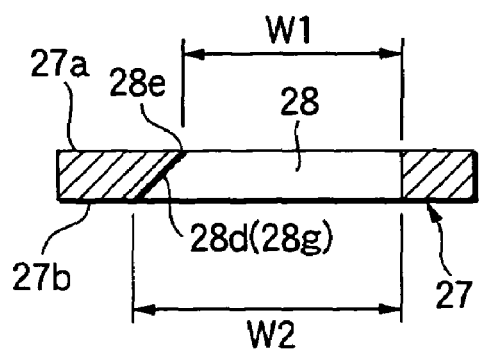
FIG. 19 is a cross sectional view of the retainer shown in FIG. 18.

That is, the respective pockets 28 adjacent in the circumferential direction have the oblique faces 28g arranged alternately right and left (see FIG. 18).

Depending on the retainer 27 of this embodiment, a grease supporting space can be made larger than that of the retainer 27 of FIG. 16. Other working effects are the same as in FIG. 16.

The separator (spacer) 29 having the recesses 32 as shown in FIG. 20 has a smaller diameter than that of the rolling element 26, and is formed with the adjacent concaves 32, 32 formed as crossing in the opposite faces 31, 31, which concaves hold the respective rolling elements 26, 26 such that the central axes 26c, 26c cross with each other as mentioned above. That is, the plane 26e of the rolling element is held in opposite to a step 32a of a recess 32. The shape of the separator shown in the embodiment is only an embodiment and may be arbitrarily designed or modified without providing any limitation.

A condition of giving pre-load between the rolling element and the raceway surface is not especially limited, and whether or not giving the pre-load during production falls within the inventive range.

The interior space of the bearing is set to be small or negative (minus) as needed, so that the high moment rigidity of the bearing can be realized.

In FIG. 14, 33 designates a sealing plate to which any of a contact seal, a non-contact seal or a non-contact shield is applied without limiting shapes within the inventive range.

A positioning practice of the sealing plate 33 is not especially limited, and if required, it may be positioned at both sides or one side, and either is within the inventive range. The sealing faces for the outer ring 21 and the inner ring 22 exist in the inventive range. Shapes of the seal, for example, lip shape and others are not especially defined, and any of a line-contact or a face-contact with the sealing face exist in the inventive range. Presence or absence of a core metal is also optional, and according to request, a type with or without the core metal may be chosen without the limited comprehension.

Structures of the sealing grooves of the inner ring 21 and the outer ring 22 are not limited, either, within the inventive range.

Presence or absence of the sealing plate 33 is also optional, and according to request, either will do in the inventive range. In the embodiment in FIG. 16, the sealing plate is not especially illustrated, but if necessary, it may be furnished as mentioned above.

Explanation will be made to one embodiment of the third aspect of the invention referring to the attached drawings.

This embodiment is only disclosed for explaining the invention, not applied to any limited interpretation, but may be modified arbitrarily as far as being in the range of the invention.

Referring FIGS. 21 to 23, explanation will be made to one embodiment of the rolling element for the rolling bearing according to the third aspect of the invention. In the drawings, 46 designates the rolling element.

Figure 23:
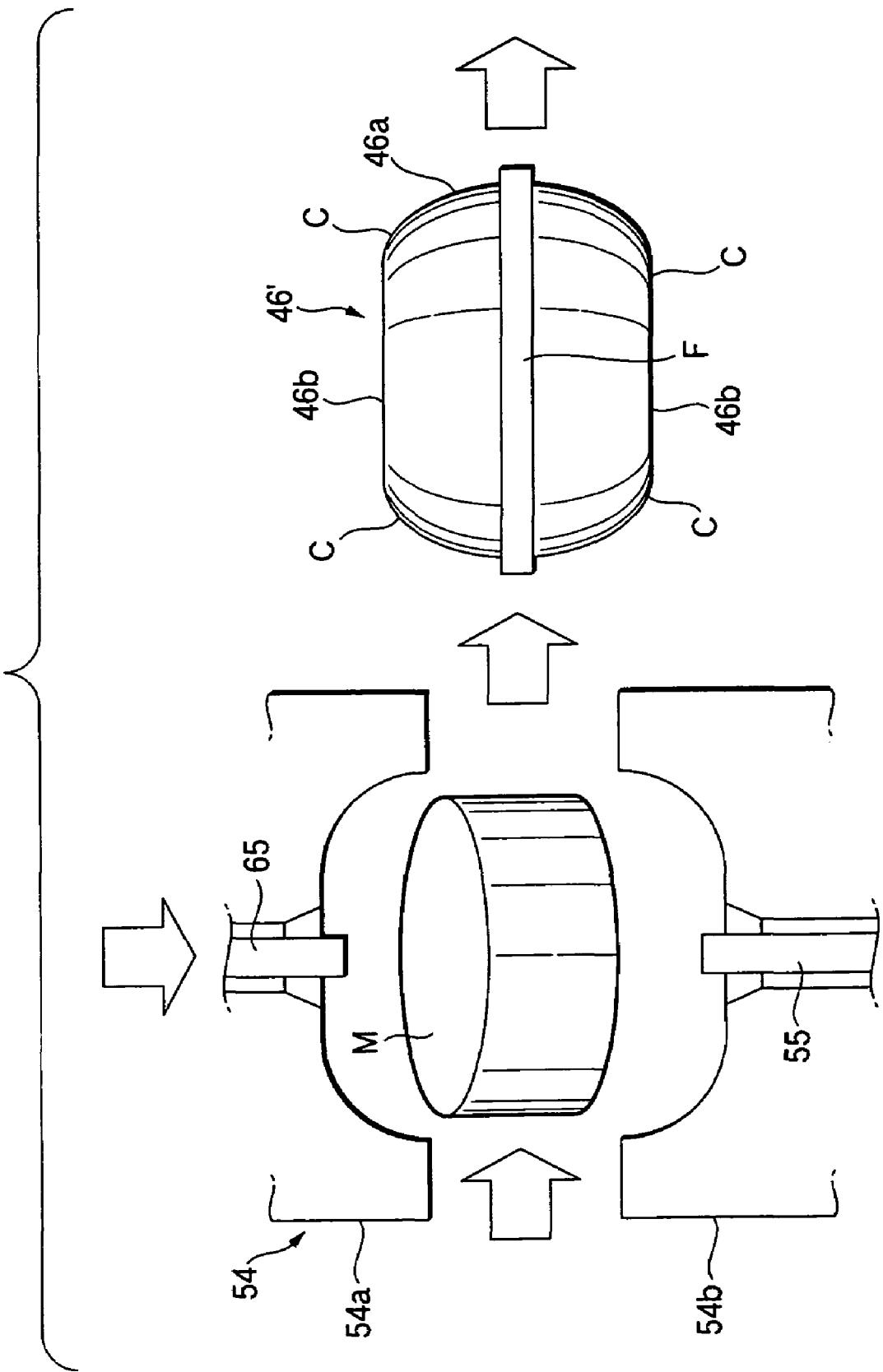
FIG. 23 is a schematic view showing an embodiment of the method of producing the rolling element for the rolling bearing of the third aspect of the invention.
Figure 24:
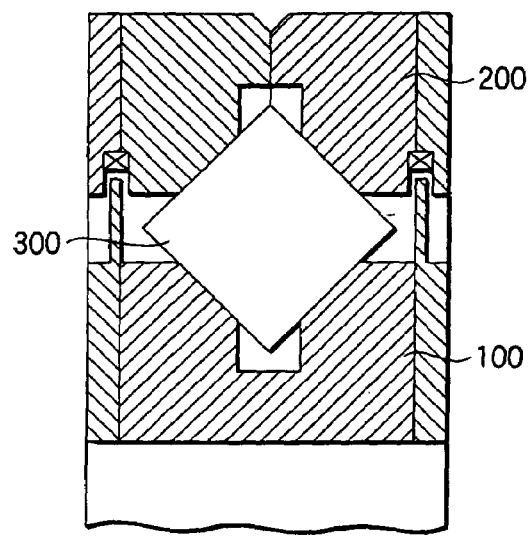
FIG. 24 shows a vertical cross sectional view of an one example of the conventional cross roller bearing.
Figure 25:
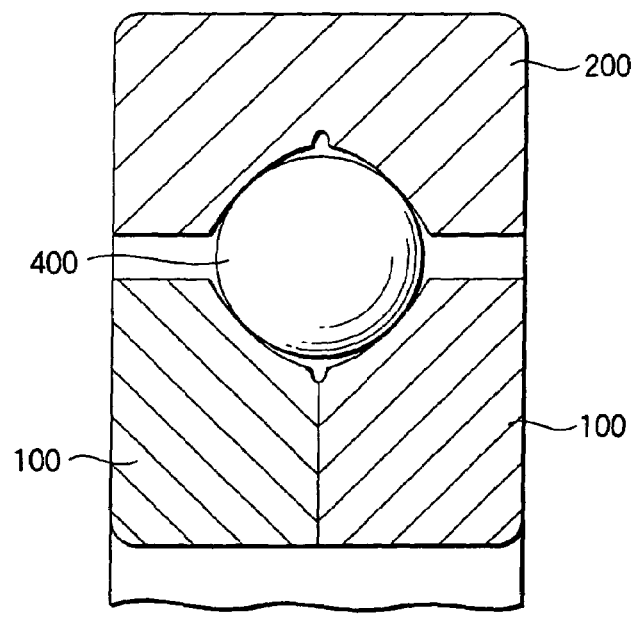
FIG. 25 shows a vertical cross sectional view of an one example of the conventional four-point contacting ball bearing.
Figure 26:
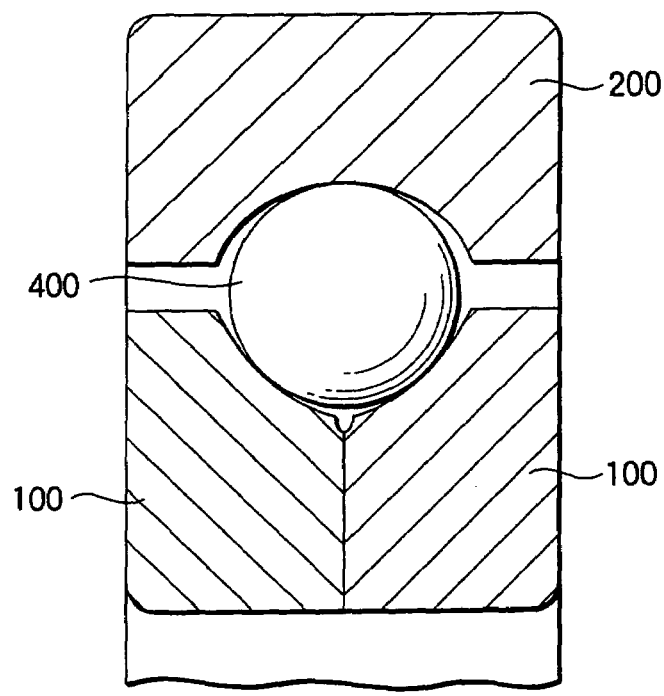
FIG. 26 shows a vertical cross sectional view of an one example of the conventional three-point contacting ball bearing.
Figure 27A:
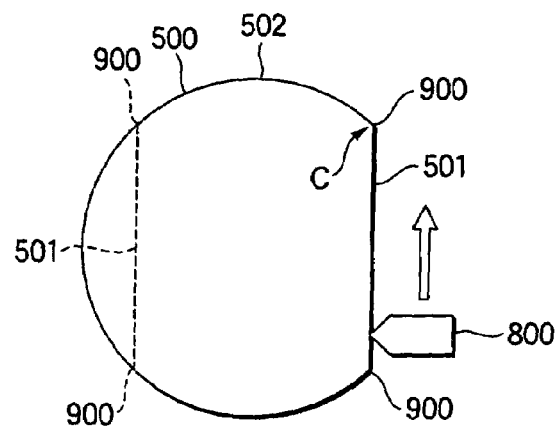
FIG. 27A shows a plane cutting process for the blank ball of the rolling bearing having the two planes.
Figure 27B:
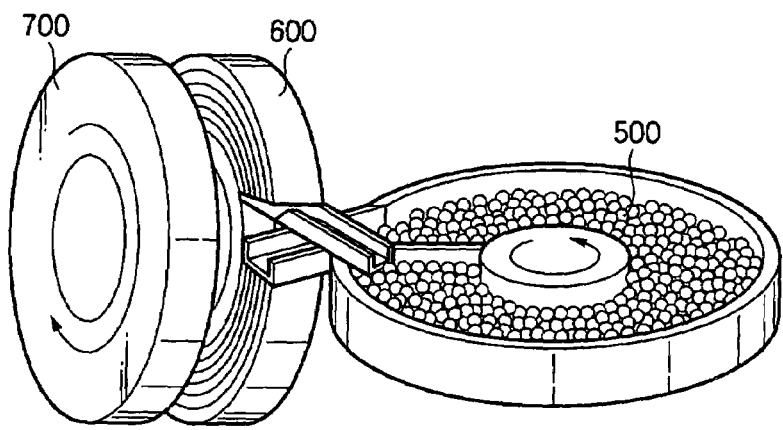
FIGS. 27B and 27C show the plane grinding process for spherically processing the rolling face after having performed plane grinding process.
Figure 27C:
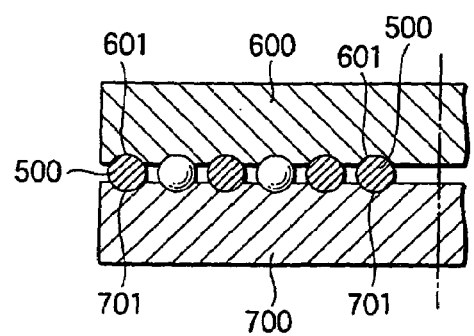

The rolling element 46 is characterized in that the wire materials of desired length are incorporated in the mold 54 of the header composed in a desired shape, the forge-forming is carried out on the blank ball 46' of the rolling element having the outer diameter portion becoming the rolling contact face having the curvature not only in the radial direction normal to the axial direction but also in the axial direction and having the plane in at least one part 46b, and an extra flesh F is removed from the outer diameter portion of the blank ball 46', whereby the rolling element for the rolling bearing is produced (see the production method in FIG. 23). For example, the rolling element 46 includes a shape (also called as DD ball) having two planes 46b, 46b and a shape (also called as D ball) having one plane 46a.

Figure 21:
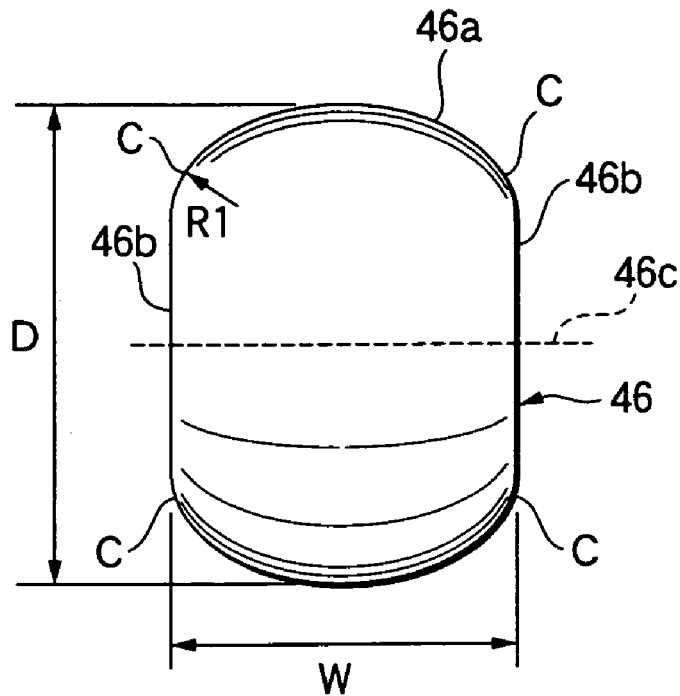
FIG. 21 is a side view showing an embodiment of the rolling element for the rolling bearing (an embodiment having the two planes) of the third aspect of the invention.

For example, the rolling element 46 (DD ball) shown in FIG. 21 has the outer diameter portion 46a to be the rolling contact face having the curvatures not only in the radial direction normal to the axial direction but also in the axial direction, and has the radius smaller than the radii of the raceway surfaces 44, 45 of the bearing rings 41, 42 incorporated with the rolling elements 46, and is a ball cut at the upper and lower parts for defining a pair of planes 46b, 46b (the opposite faces) (referring to such a structure defined with the opposite faces 46b, 46b by cutting the upper and lower parts of the ball, and the same is applied in the following description). In this embodiment, when forge-forming the blank ball of rolling element 46', the crossing point C between the planes 46b, 46b and the outer diameter portion 46a having the curvature is connected at the arbitrary curvature R.

Figure 22:
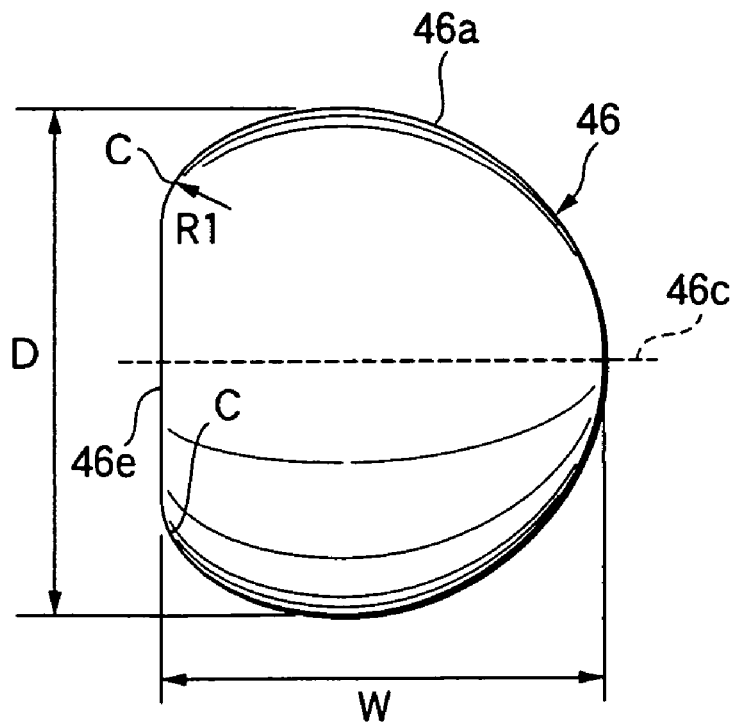
FIG. 22 is a side view showing an embodiment of the rolling element for the rolling bearing (an embodiment having one plane) of the third aspect of the invention.

The rolling element 46 may, as shown in FIG. 22, be one-side cut ball (D ball) by cutting either of the upper and lower parts and forming one plane 46e, and in this embodiment, when forge-forming the blank ball of rolling element 46', the crossing point C between the planes 46b, 46b and the outer diameter portion 46a having the curvature is connected at the arbitrary curvature R.

The plane 46b (46e) can be formed at the same time when forge-forming the blank ball of rolling element, and so no cost is taken for forming the planes. In regard to shapes and dimensions of blank balls, margins are taken into consideration so as to form requested shapes (FIGS. 21 and 22) as the final rolling elements 46. Also according to this embodiment, when forge-forming the blank ball of rolling element 46', the crossing point C between the planes 46b (46e) and the outer diameter portion 46a having the curvature is connected at the arbitrary curvature R, and so no cost is taken for rounding the edges.

The plane 46b (46e) is optional, and optimum shapes and dimensions are sufficient.

The plane 46b (46e) may be formed at a central position with a slightly dimpled recess to be a lubricant pool at the same time as forge-forming blank balls. In the recess, a desired lubricant (grease or oil) is sealed. The recess part 26d may be, for example, a conical-trapezoidal shape (tapering or expanding toward the center of the ball), a semi-spherical, cylindrical, or rectangular shapes, otherwise a slit-like groove (single or plural pieces) lateral in a diameter direction is also satisfactory. The recess parts 46b (46e) may be formed in one or plural positions. In a case of forming the recess parts in the plural positions, those may be continuous or independent, and not only the same shape but optional ones may be selected.

One example of the specific structure of the rolling element 46 shown in FIG. 21 is as follows.

Ball diameter D: 6.35 mm,
Distance W between the planes: 4.5 mm
Crossing point between the outer diameter portion and the plane: connected at R of 1 mm One example of the specific structure of the rolling element 46 shown in FIG. 22 is as follows.

Ball diameter D: 6.35 mm,

Distance W between the planes: 5.425 mm

Crossing point between the outer diameter portion and the plane: connected at R of 1 mm The rolling element 46 is not especially limited in the distance W between the planes, and the ratio therebetween may be equal or non-equal arbitrarily within the range of the invention. That is, the planes 46b, 46b of the rolling element 46 may be symmetrical or asymmetrical within the inventive range. The rolling element 46 having the asymmetrical two planes, is served especially for high rotation. If a large end 46d of the asymmetrical planes is arranged to face to the inner ring of the bearing, rotation of the rolling element 46 is made stable, so that a lower torque can be realized.

The whole shape of the rolling element 46, the two planes or one plane of the plane 46b (46e), and sizes of the curvature in the axial direction of the outer diameter portion 46a are not limited to the above mentioned shapes at all, and may be optionally modified within the inventive range. For example, it is sufficient that the rolling element 46 has non-parallel two planes instead of the planes 46b, 46b, and has the central axis 46c of rotation perpendicular with respect to both faces.

One embodiment of the production method of the rolling element will be explained with reference to FIG. 23. The method is outlined as ① the process of incorporating the wire materials into the mold→② the process of forming the blank balls of rolling elements→③ the process of extruding the blank balls→④ the process of removing extra flesh.

At first, the wire materials M cut in the desired length are incorporated into the mold 54 of the header composed in the desired shape (① process). The mold 54 has a shape enabling to obtain shapes and dimensions of blank balls taking the margin into consideration and is divided into an upper and a lower molds 54a, 54b such that shapes requested as the rolling element 46 are finally turned out (FIG. 21 or FIG. 22). That is, as one example of the mold 54 for producing the rolling element 46 shown in FIG. 21, such a shape is formed having the upper and lower molds 54a, 54b of the header, the two planes 46b, 46b, the spherical rolling face 46a (the outer diameter portion having the curvatures not only in the radial direction normal to the axial direction but also in the axial direction), and the crossing point C of the outer diameter portion 46a and the plane 46b being connected at the curvature R. When producing the rolling element 46 shown in FIG. 22, it is sufficient that either of the molds 54a (54b) is processed with a shape corresponding to the plane 46b.

Next, by means of the upper and lower molds 54a, 54b of the header incorporated with the wire materials M as mentioned above, the outer diameter portion 46 becoming the rolling contact face has the curvatures not only in the radial direction normal to the axial direction but also in the axial direction, and the blank ball 46' of rolling element having at least one plane 46b (② process). Conditions as compressive force, compressive time and molding temperature are responsible appropriately.

Subsequently, the formed blank ball 46' of rolling element is extruded outside of the mold 54 by injector pins 55, 55 furnished at both sides (③ the process). Depending on the conditions, the injector pins 55, 55 may be omitted.

If the extra flesh F remain on the outer diameter portion 46a of the extruded blank ball 46' of rolling element, it is removed.

According to this embodiment, the plane 46b may be formed at the blank ball of rolling element. Shaping by such mold 54, complicated shapes are available, not costing up.

Following the production method of this embodiment, when forming the blank ball of rolling element, the crossing point C of the outer diameter portion 46a and the plane 46b is connected at the curvature R.

Note that the rolling element 46 according to the third aspect of the present invention can be applied to relative embodiments according to the above-mentioned first and second aspects of the present invention.

As illustrated in FIGS. 10 and 14, the rolling element 46 can be guided by the retainer 27, and also when the rolling element 46 falls down within the pocket of the retainer 27, since the crossing point C between the plane 46b (46e) and the outer diameter portion 46a having the curvature is connected at an arbitrary curvature R, no abnormal abrasion by the edge portion occurs in the retainer 27.

So far, a sharp edge has been created at the crossing point C between the plane 46b (46e) and the outer diameter portion 46a having the curvature, and the edge portion has been rounded after having performed the round processing of the rolling face (the outer diameter portion 46a), but in the invention, the edge portion is in advance connected at the arbitrary curvature R, so that the rounding process on the edge portion is not required after having performed the round processing of the rolling face, and the abnormal abrasion does not happen the retainer 27.

Note that it is possible for a person skilled in the art to utilize and combine some features of the first to third aspect of the present invention into and with the other aspect.

While there has been described in connection with the preferred embodiments of the invention, it will be obvious to those skilled in the art that various changes and modifications may be made therein without departing from the invention, and it is aimed, therefore, to cover in the appended claim all such changes and modifications as fall within the true spirit and scope of the invention.

The first aspect of the invention is structured as above mentioned, and since the rounded balls made of the steel balls and the rolling elements are mixed at the determined mixing ratio for carrying out the process (polishing or grinding), the process of a considerable amount can be practiced at once, so that it is possible to offer the rolling elements having at least one planes of the high precise process at low cost.

In comparison with processing of the rolling elements only, the stable process is progressed bit by bit, and disturbance is less to be influenced, so that the process can be made at high precision.

In the lapping apparatus as the sphere processing apparatus for reducing the invention to practice, it is necessary to maintain the processing load effected to one piece of the processed ball constant for providing the high processing precision, but according to the method of processing the balls of this embodiment, the process of the high precision is possible even in a small lot.

Further by the invention, it is no longer necessary to make a new plane by an additional process, large cost-down can be accomplished, and no flaws are created on the ball surface.

Further, following the invention, the plane is formed at the step of making the blank ball of rolling element, so that the boundary between the plane and the spherical surface may be made rounded without any edges, and of course, a post-process is not required.

Depending on the producing method of the invention, the rounded steel balls can be mixed and processed efficiently.

The second aspect of the invention has the plane of at least one plane which is provided with the recess as the lubricant pool, and incorporates the rolling elements between the inner and outer rings via the retainer, the rolling element in advance connecting the cross point between the plane and the outer diameter portion having the curvature at a tangent R, and therefore exhibits the particular working effects as follows together with those of Japanese Patent Laid Open No. 50264/2001

(1) The contact part between the retainer and the plane of the rolling element always contributes to good formation of an oil film by the base oil (when lubricating a grease) of the grease or the oil (when lubricating the oil), no abnormal abrasion occurs in the retainer 27.

(2) When the rolling element falls down within the pocket of the retainer, since the crossing point between the plane and the outer diameter portion having the curvature is connected at an arbitrary curvature R, no abnormal abrasion by the edge portion occurs in the retainer.

(3) So far, a sharp edge has been created at the crossing point between the plane and the outer diameter portion having the curvature, and the edge portion has been rounded after having performed the round processing of the rolling face, but according to the invention, the edge portion is in advance connected at the arbitrary curvature R, so that the rounding process on the edge portion is not required after having performed the round processing of the rolling face, resulting in reducing the cost.

(4) As a result of reduction of the cost, the cost for the whole apparatus is also lowered.

The third aspect of the invention has the above mentioned structure, and the rolling element has at least one plane, and for forming this plane, the forging-forming by the header is served from wire materials to forming blank ball of rolling element, and the following effects can be obtained.

(1) When moving the wire material to the blank ball, one plane or two planes can be formed depending on the forging by the header, a large cost-down is possible toward reduction to practice.

(2) So far, a sharp edge has been created at the crossing point between the plane and the outer diameter portion having the curvature, and the edge portion has been rounded after having performed the round processing of the rolling face, but according to the invention, depending on the mold-forging, the edge portion is in advance connected at the arbitrary curvature R, so that the rounding process on the edge portion is not required after having performed the round processing of the rolling face, resulting in reducing the cost.

(3) As mentioned above, the cost-down can be accomplished toward reduction to practice, and the whole of rolling bearings are offered cheaply, so that the apparatus is also cost down.

What is claimed is:

1. A method of producing rolling elements for a rolling bearing, comprising:

placing a wire material of predetermined length in a space that is defined by at least first and second molds and has a predetermined shape;

forge-forming the wire material into a blank ball for each rolling elements, said blank ball including an outer diameter portion becoming a rolling contact face that has curvatures in an axial direction thereof and a radial direction normal to the axial direction and including at least one plane; and removing an extra flesh from the outer diameter portion of the blank ball, to thereby produce each of the rolling elements, wherein the blank ball thus forge-formed has a connecting portion that is located between the rolling contact face and one of the at least one plane the connecting portion having a predetermined radius of curvature.

2. The method according to claim 1, further comprising:

releasing the blank ball thus forge-formed from the space, before the removing step is carried out.

3. The method according to claim 1, further comprising:

forming a slightly dimpled recess at a central position of the plane at the same time as forge-forming blank balls.

4. A method of producing rolling elements comprising:

(a) incorporating a wire material into a mold;

(b) forge-forming the wire material into a blank ball having at least one plane for each of the rolling elements; and (c) ejecting the blank ball outside of the mold, wherein a predetermined radius of curvature is forge formed at a connecting portion located between a rolling contact face and said at least one plane on said blank ball.

5. The method according to claim 4, further comprising:

removing an extra flesh from the blank ball, to thereby produce each of the rolling elements.

6. The method according to claim 4, wherein at (b), said blank ball thus forge-formed has an outer diameter portion becoming a rolling contact face that has curvatures in an axial direction thereof and a radial direction normal to the axial direction of the blank ball.

7. The method according to claim 4, wherein (c) further includes ejecting the blank ball of each of the rolling elements outside of the mold by an ejector pin.

* * * * *